United States Patent
Kitada

(10) Patent No.: US 7,996,490 B2
(45) Date of Patent: **\*Aug. 9, 2011**

(54) SYSTEM AND METHOD FOR CHANGING A FUNCTIONALITY OF AN IMAGE PROCESSING DEVICE BASED ON A FILE CORRESPONDING TO A NETWORK APPLICATION

(75) Inventor: Hiroshi Kitada, Tuckahoe, NY (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 125 days.

This patent is subject to a terminal disclaimer.

(21) Appl. No.: 12/406,412

(22) Filed: Mar. 18, 2009

(65) Prior Publication Data

US 2009/0222534 A1 Sep. 3, 2009

Related U.S. Application Data

(63) Continuation of application No. 11/092,836, filed on Mar. 30, 2005, now Pat. No. 7,533,155.

(51) Int. Cl.
G06F 15/16 (2006.01)
G06F 15/173 (2006.01)
G06F 15/177 (2006.01)

(52) U.S. Cl. ........... 709/217; 709/245; 709/223; 705/34

(58) Field of Classification Search .................. 709/217, 709/201, 203, 223, 245; 705/34; 358/1.18
See application file for complete search history.

(56) References Cited

U.S. PATENT DOCUMENTS

| | | | |
|---|---|---|---|
| 5,323,393 A | 6/1994 | Barrett et al. | |
| 5,428,782 A | 6/1995 | White | |
| 5,666,490 A | 9/1997 | Gillings et al. | |
| 5,694,601 A | 12/1997 | White | |
| 5,793,964 A | 8/1998 | Rogers et al. | |
| 5,862,404 A | 1/1999 | Onaga | |
| 6,009,442 A | 12/1999 | Chen et al. | |
| 6,020,973 A | 2/2000 | Levine et al. | |
| 6,023,722 A | 2/2000 | Colyer | |
| 6,119,137 A | 9/2000 | Smith et al. | |
| 6,125,372 A | 9/2000 | White | |
| 6,189,069 B1 | 2/2001 | Parkes et al. | |
| 6,209,048 B1 | 3/2001 | Wolff | |
| 6,219,718 B1 | 4/2001 | Villapando | |
| 6,262,732 B1 | 7/2001 | Coleman et al. | |
| 6,289,371 B1 | 9/2001 | Kumpf et al. | |
| 6,327,045 B1 | 12/2001 | Teng et al. | |
| 6,330,611 B1 | 12/2001 | Itoh et al. | |
| 6,424,424 B1 | 7/2002 | Lomas et al. | |

(Continued)

FOREIGN PATENT DOCUMENTS

EP 1 197 882 4/2002

(Continued)

*Primary Examiner* — Haresh N Patel
(74) *Attorney, Agent, or Firm* — Oblon, Spivak, McClelland, Maier & Neustadt, L.L.P.

(57) ABSTRACT

A method and system for managing documents, where the system includes a document manager server connected to image processing devices and to applications via a network. The document manager server receives identification information from the image processing devices and transmits information relating to network applications to the image processing devices. This information is then used to change the functionality of the image processing device.

18 Claims, 18 Drawing Sheets

U.S. PATENT DOCUMENTS

| | | | |
|---|---|---|---|
| 6,434,343 B1 | 8/2002 | Kobayashi et al. | |
| 6,476,930 B1 * | 11/2002 | Roberts et al. | 358/1.18 |
| 6,477,567 B1 | 11/2002 | Ohara | |
| 6,480,304 B1 | 11/2002 | Os et al. | |
| 6,496,206 B1 | 12/2002 | Mernyk et al. | |
| 6,498,912 B1 * | 12/2002 | Leni et al. | 399/79 |
| 6,567,121 B1 | 5/2003 | Kuno | |
| 6,578,067 B1 | 6/2003 | Okazaki et al. | |
| 6,633,872 B2 | 10/2003 | Ambrosini et al. | |
| 6,694,376 B1 | 2/2004 | Ohara | |
| 6,738,841 B1 | 5/2004 | Wolff | |
| 6,785,023 B1 | 8/2004 | Iida | |
| 6,880,091 B1 | 4/2005 | Mattis et al. | |
| 7,142,690 B2 * | 11/2006 | Hyakutake et al. | 382/100 |
| 7,194,433 B1 * | 3/2007 | Hyakutake et al. | 705/34 |
| 7,249,177 B1 | 7/2007 | Miller | |
| 7,533,155 B2 * | 5/2009 | Kitada | 709/217 |
| 2002/0099707 A1 | 7/2002 | Matsumoto | |
| 2002/0114013 A1 | 8/2002 | Hyakutake et al. | |
| 2002/0156801 A1 | 10/2002 | Kitada et al. | |
| 2002/0156834 A1 | 10/2002 | Kitada et al. | |
| 2003/0076531 A1 | 4/2003 | Kawasumi et al. | |
| 2003/0154374 A1 | 8/2003 | Osada | |
| 2003/0217095 A1 * | 11/2003 | Kitada et al. | 709/201 |
| 2003/0233437 A1 * | 12/2003 | Kitada et al. | 709/223 |
| 2004/0215671 A1 * | 10/2004 | Hyakutake et al. | 707/203 |
| 2005/0021608 A1 | 1/2005 | Wolff | |
| 2006/0190622 A1 * | 8/2006 | Kitada et al. | 709/245 |

FOREIGN PATENT DOCUMENTS

| | | |
|---|---|---|
| EP | 1 255 205 | 11/2002 |
| EP | 1 255 206 | 11/2002 |
| JP | 2002-123620 | 4/2002 |
| JP | 2002-366412 | 12/2002 |
| JP | 2002-373063 | 12/2002 |
| JP | 2003-44509 | 2/2003 |
| JP | 2003-233544 | 8/2003 |
| JP | 2003-345920 | 12/2003 |
| JP | 2004-139347 | 5/2004 |
| JP | 2004-171571 | 6/2004 |

\* cited by examiner

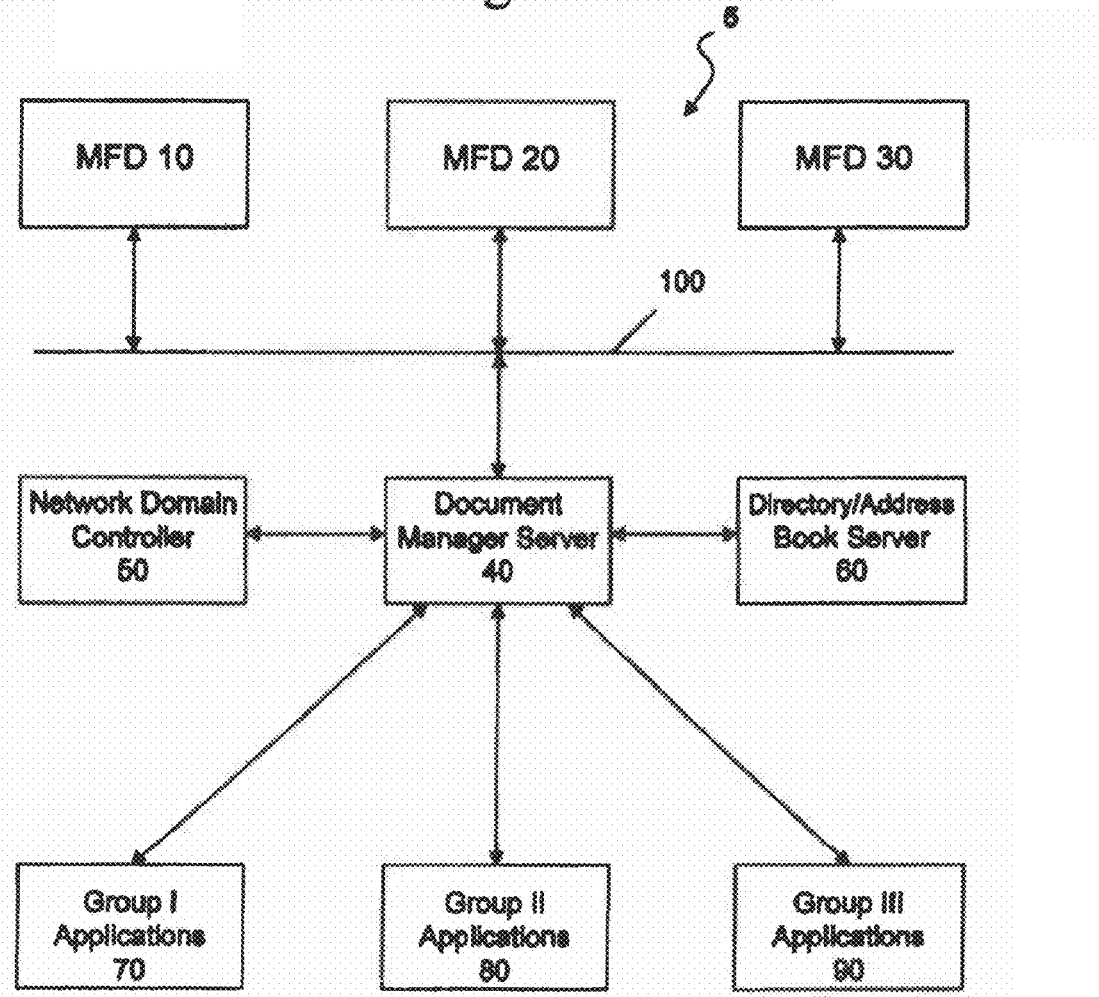

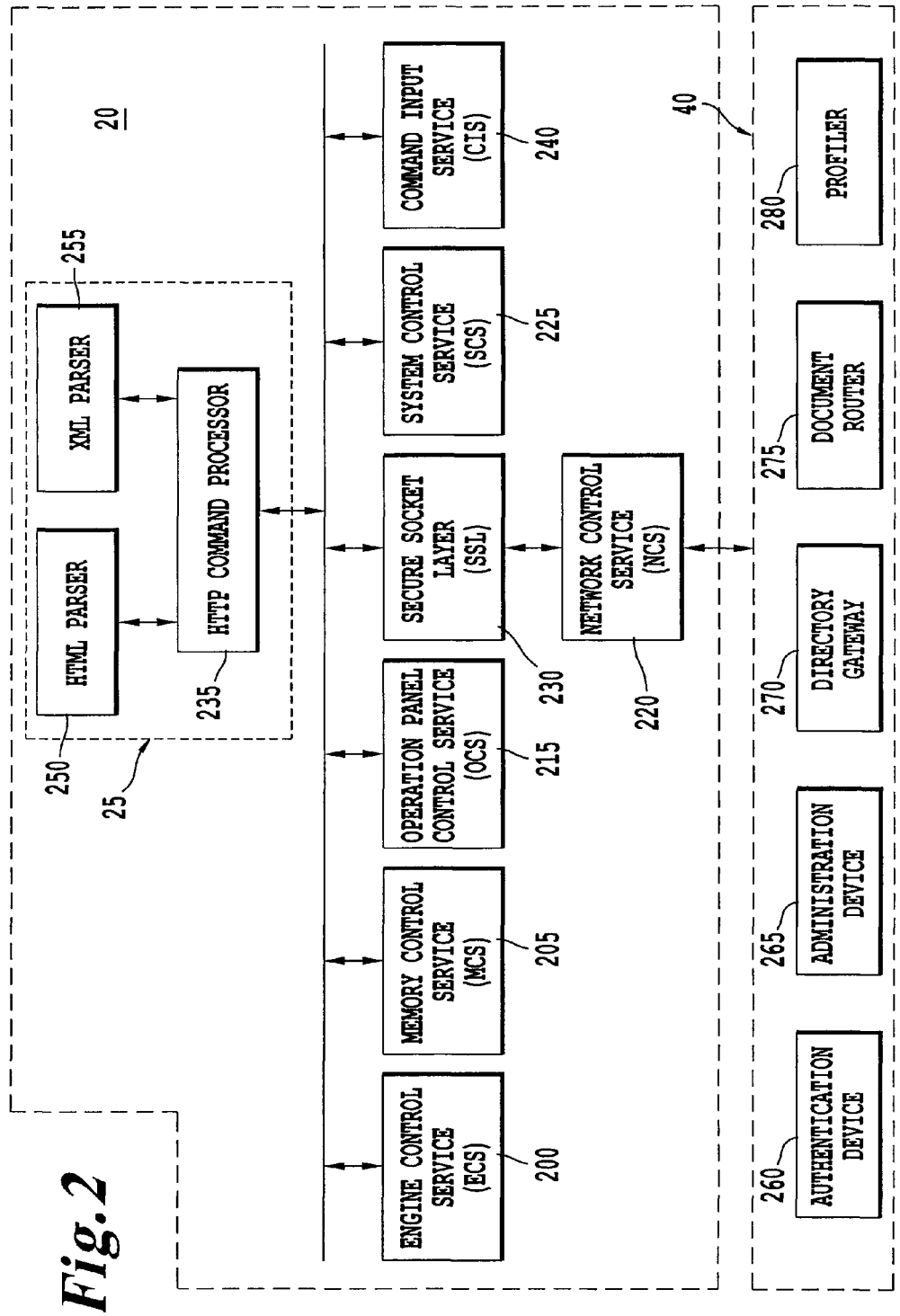

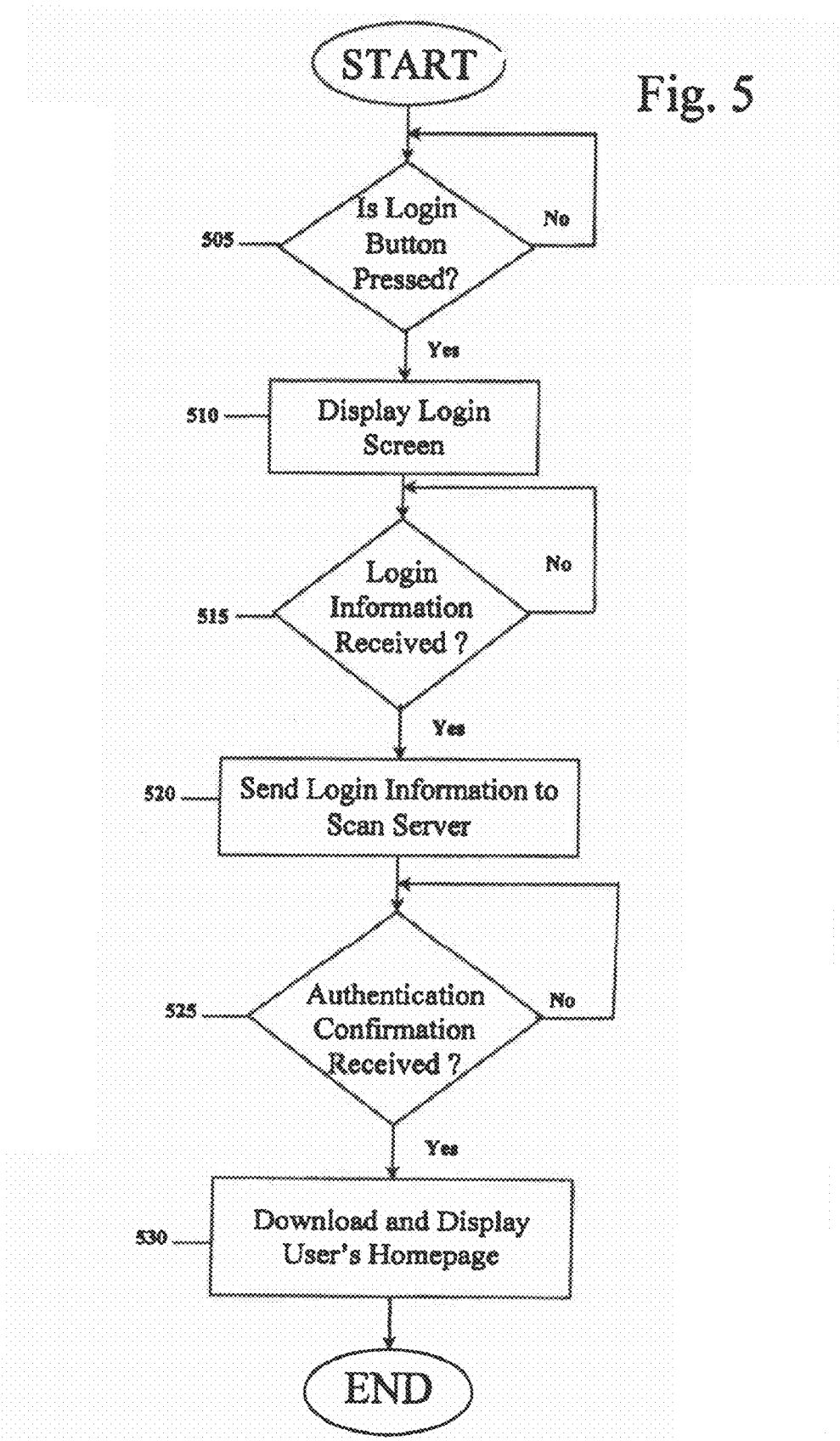

```
<root>
    <error_code>0</error_code>
    <error_description />
    <Profile_ID>p_F7</Profile_ID>
    <BaseDN>o=rcus</BaseDN>
    <NT_Authentication>0</NT_Authentication>
    <LDAP_Enabled>-1</LDAP_Enabled>
    <Time_Out>60</Time_Out>
    <Max_Result_Count>0</Max_Result_Count>

<Plug_ins>
    <Plug_in>
        <Plug_in_name>RightFax<Plug-_in_name>
        <Login_required>1</Login_required>
        <Integrated_login>1</Integrated_login>
        <Login_URL>login_RightFax.asp</Login_URL>
    </Plug_in>
    <Plug_in>
        <Plug_in_name>Documentum</Plug-_in_name>
        <Login_required>1</Login_required>
        <Integrated_login>0</Integrated_login>
        <Login_URL>login_Documentum.asp</Login_URL>
    </Plug_in>
    <Plug_in>
        <Plug_in_name>Stellent</Plug-_in_name>
        <Login_required>0</Login_required>
        <Integrated_login>1</Integrated_login>
        <Login_URL> </Login_URL>
    </Plug_in>
    </Plug_ins>

<root>
```

*Fig. 7*

Plug-in_name: Name of plug-in.
Log-in_required: Indicates if login is required, 1-login required, 0-login not required.
Integrated_login: Indicates if separate login is required for this plug-in. 1-no separate login, 0-separate login.
Login_URL: If <Integrate_Login> = 0, specify URL used for separate login.

SYSTEM AND METHOD FOR CHANGING A FUNCTIONALITY OF AN IMAGE PROCESSING DEVICE BASED ON A FILE CORRESPONDING TO A NETWORK APPLICATION

CROSS-REFERENCE TO RELATED APPLICATIONS

This application is a continuation of and is based upon and claims the benefit of priority under 35 U.S.C. §120 for U.S. Ser. No. 11/092,836, now U.S. Pat. No. 7,533,155, filed Mar. 30, 2005, the entire contents of which are incorporated herein by reference.

BACKGROUND OF THE INVENTION

1. Field of the Invention

The present invention is directed to methods and computer-based systems for managing documents or files between multi-function devices and various backend network applications.

2. Discussion of the Background

Over the past several years, there has been an increase in the number and types of document-related applications available over networks. These applications can include document management systems, such as those specializing in managing documents of various specific contents, for example medical, legal, financial, marketing, scientific, educational, etc. Other applications include various delivery systems, such as e-mail servers, facsimile servers, and/or regular mail delivery. Yet other applications include document processing systems, such as format conversion and optical character recognition. Further applications include document management systems used to store, organize, and manage various documents. Such applications will be referred to hereinafter as "back-end" applications.

Various systems for accessing these network applications from image processing devices (e.g., scanners, printers, copy machines, cameras) have been contemplated. One system associates a computer with each image processing device for managing the documents with the network applications. The computers communicate with the various network applications to enable the use of these applications by the user of the image processing devices. For example, the computers request and receive from the network applications information about the format and content of the data required by the applications to manage documents. The computers process this information and configure the image processing devices to provide the correct format and content.

Such systems, however, have numerous drawbacks, especially if considered within an environment of a relatively large office with significant numbers of image processing devices using different kinds of network document applications, which may change over time. Specifically, the requirement of having a computer for each image processing device increases cost and decreases flexibility. This requirement creates the burden of maintaining, securing and upgrading the computers. When new applications are integrated within the system, each computer and/or each image processing device must be updated and made compatible with the new network application. The task of updating each local computer and/or each image processing device creates a costly burden on the administrator of the system, and severely increases the traffic over the company's network. This increase in traffic can slow down the company's entire network.

SUMMARY OF THE INVENTION

The present inventors have determined that there is a need for more efficiently and dynamically managing documents between image processing devices and various network applications simultaneously. The present invention provides a method and a system that satisfies this need.

The system of the present invention includes at least one image processing device, such as a multi-function device, but preferably several image processing devices, a document manager server connected to the image processing devices and network applications connected to the document manager server. The document manager server functions as an agent for the image processing devices and as a gateway to the network applications.

The document manager server receives identification from the image processing devices, looks up a profile and transmits the profile to the image processing devices. It should be noted that these image processing devices can be implemented as one or a plurality of various types of multifunction devices (MFDs). The profile includes information about applications connected to the document manager server via a network. This information can be in the form of specific parameters identifying various backend network applications that are available for use by the MFD. Based on this profile information the MFD receives software plug-ins transmitted from the document manager server, which correspond to specific backend network applications. The functionality of the MFD can then be changed or customized based on this received plug-in information. More specifically, based on the profile and plug-in information, the image processing device can adjust its user interface and corresponding functions available to a user to interact with the network applications. The document manager server can receive job information, e.g., a document, from the image processing devices, process the job information and transmit the processed information to applications connected to the document manager server. The software plug-ins allow the user to add specific indexing and processing instructions to the image file before it is actually scanned. The software plug-ins also allow for the user to perform specialized login functions to gain access to backend applications requiring an additional level of authentication. The applications can include for example an e-mail server, a fax server, a file format conversion system, an optical character recognition system, a document management system or a file storage system. The system also provides a method for the image processing device to determine if a specific backend application requires user authentication once the user is already logged into a network domain.

Advantageously, the system and method of the present invention allow the image processing devices to automatically be updated with information enabling the use of an application newly incorporated onto the network. Updating of the image processing devices can be performed efficiently by the document manager server based on the profile information available to the image processing device. Specific software plug-ins can be stored in the document manager server and accessed by the MFD to be used corresponding to specific backend applications incorporated into the system. The server profile which is transmitted to the image processing device also allows the user interface to be tailored so that the user can select various processing functions available from the image processing device. The server profile enables various instructions, indexes or process instructions to be attached to the image data before it is processed by the MFD. The MFD then attaches such instructions to the scanned image before it transmitted to the document manager server. Thus, individual image processing devices need not be upgraded with new firmware, which is costly and time consuming. The document manager server can efficiently manage various aspects of the relationship between the image processing devices and the network applications. For example, the document manager server can manage the security of a global directory server, can manage the financial relationship (e.g., related to billing, accounting, and licensing issues) between the image processing devices and the network applications, can process documents to and from the image processing devices and the network applications, can allow for modification of the image data, and can also allow the user of the image processing device to log-in to various applications, if necessary.

Further, since the document manager server is easily customized, various plug-ins can be included which relate to each newly installed network application. The plug-ins allow for the image processing device to implement customized functions relating to each network application, and specifically to backend applications. The document manager server can transmit the plug-ins to the image processing device, and the image processing device customizes its operations based on the received plug-in. The plug-in causes the image processing device to query the user for further authentication information if needed to login to a network application. Another feature which is enabled by the system is the capability for the image processing device to identify if a user has already been authenticated against a particular user authentication system. The plug-ins also allow for the user to include, or attach, specific processing instructions with/to a scanned or processed document, before the document is transmitted to the document manager server and subsequently processed by the backend application.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram showing an overall system configuration according to one embodiment of the present invention;

FIG. 2 is a block diagram illustrating a browser for the image processing device according to one embodiment of the present invention;

FIG. 5 is a flowchart illustrating steps performed in authenticating a user according to one embodiment of the present invention;

FIG. 7 shows exemplary code of a plug-in associated with a backend application according to one embodiment of the present invention.

DESCRIPTION OF THE PREFERRED EMBODIMENTS

Figure 3A:
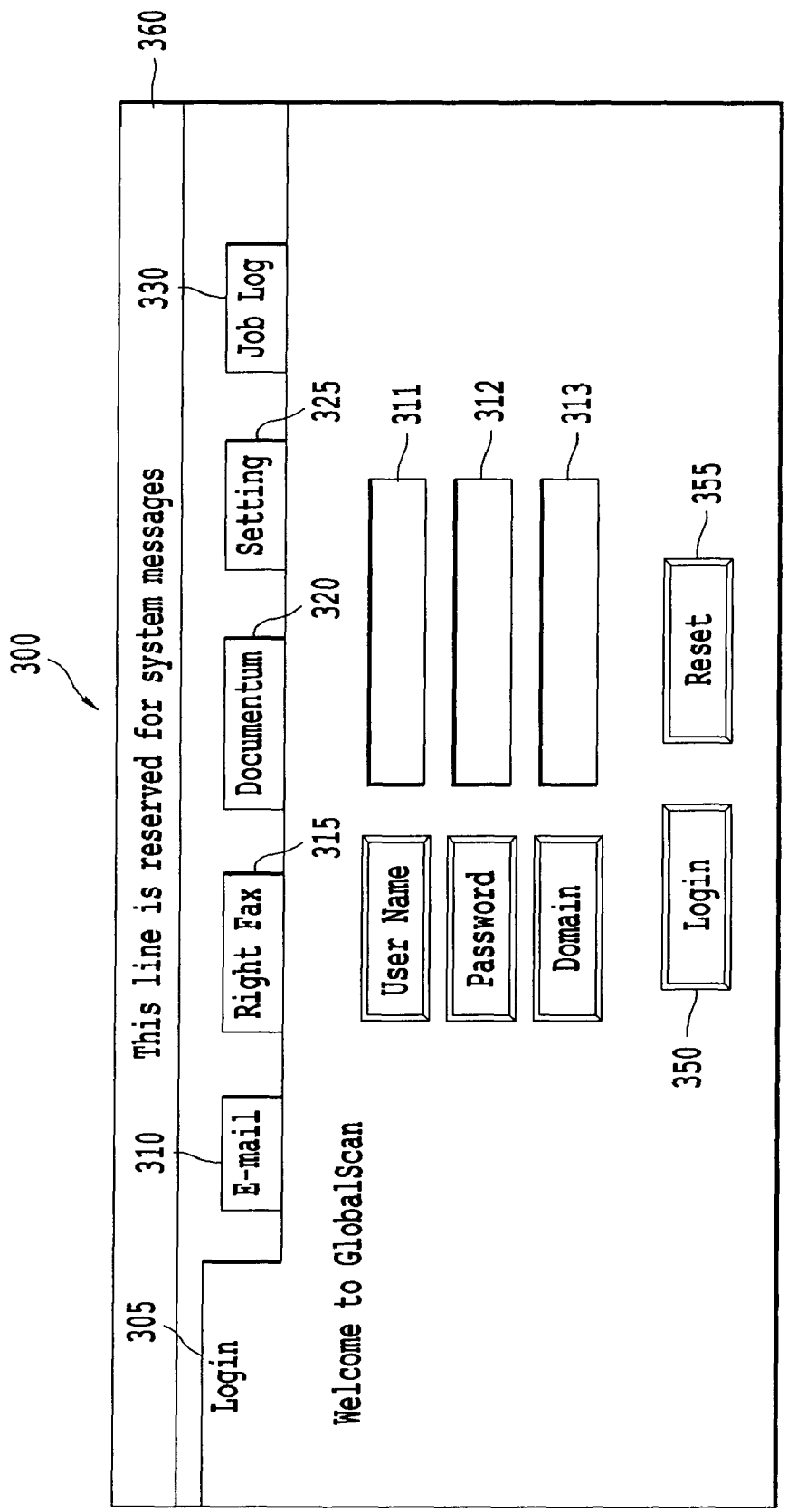
FIG. 3A shows an example of a log-in user interface displayed on the image processing device according to one embodiment of the present invention.

Referring now to the drawings, wherein like reference numerals designate identical or corresponding parts throughout the several views, FIG. 1 is a block diagram of a system 5 for managing documents according to the present invention, and in particular to allow a document manager server 40 to manage documents and files by processing information related to applications, which can be grouped in different groups I-Ill. The system 5 includes a network 100 that interconnects at least one, but preferably a plurality of image processing devices which may be implemented as multifunction devices (MFDs) 10-30, to a document manager server 40. The network 100 preferably uses TCP/IP (Transmission Control Protocol/Internet Protocol), but any other desirable network protocol such as, for example IPX/SPX (Internetwork Packet Exchange/Sequential Packet Exchange), NetBEUI (NetBIOS Extended User Interface), or NetBIOS (Network Basic Input/Output System) is possible. The network 100 can be a local area network, a wide area network, any type of network such as an intranet, an extranet, the Internet or a combination thereof. Other communications links for the network 100, such as a virtual private network, or a wireless link, or any other suitable substitute may be used as well.

As shown in FIG. 1, the devices 10-30 can be multi-function devices, or "MFDs." An MFD may incorporate or be any one of a plurality of a scanner, a copy machine, a printer, a fax machine, a digital camera, other office devices, and combinations thereof. Any one or combinations of these devices are referred to as a MFD, generally. Various types of MFDs are commonly known in the art and share common features and hardware with the MFDs of the present invention. In one embodiment of the present invention, the MFD is a portable device, such as a digital camera, connectable to the Internet via a wired or wireless connection. Such an MFD combines digital imaging and internet capabilities so that one can capture still images, sounds or videos and share such multimedia using wired or wireless connections from various locations. The MFD can create web pages, send and receive e-mails with attachments, edit images, FTP files, surf the Internet, and send or receive a fax. In another embodiment, the MFD is a multiple scanner, photocopier and printer, as described in more detail below with corresponding FIGS. 11-12.

As shown in FIG. 1, the document manager server 40 is connected to a directory/address book server 60 (or "directory server" or "global directory"). The directory server 60 can include information such as the names, addresses, network addresses, e-mail addresses, phone/fax numbers, other types of destination information, and authorization of individuals. Other information can also be included in the directory server 60. Examples of directory servers 60 compatible with the present invention include, but are not limited to, Lotus Notes™, Microsoft Exchange™, and LDAP ("Lightweight Directory Access Protocol") enabled directory servers. LDAP is a software protocol that enables a user to locate organizations, individuals, files, devices in a network. The document manager server 40 can also be connected to a network domain controller 50 that controls authentication of the MFD user.

The network domain controller 50 is, for example, a server that responds to security authentication requests, such as logging in, within its domain. The network domain controller 50 may be backed up by one or more backup network domain controllers that can optionally also handle security authentication. Examples of a directory server 60 and a network domain controller 50 are disclosed in U.S. application Ser. No. 10/243,645, filed Sep. 16, 2002, the entire content of which is hereby incorporated by reference. The network domain controller is described in greater detail below.

Briefly, the system 5 provides access for the users of the MFDs 10-30 to the information stored at the directory server 60 via the document manager server 40. A user can request a search of the company's global directory stored at the directory server 60. The document manager server 40 can pass the search request to the directory server 60 and can receive the search results (e.g., e-mail addresses and/or fax numbers) from the directory server 60. The document manager server 40 can pass the search results to the MFD 20, which can temporarily store and display them. The user can select a displayed result (e.g., an e-mail addresses or a fax number), scan a document, and request that the scanned document be transmitted, e-mailed and/or faxed to the selected destination.

The document manager server 40 can be configured to act as an intermediate agent, or a gateway between a plurality of network applications 50, 60, 70, 80, and 90 and the MFDs. The applications 70, 80, and 90 can include for example an e-mail server, a fax server, a file format conversion system, an optical character recognition (OCR) system, a document management system and a file storage system or any combination of multiples thereof. The document management server 40 is capable of supporting a plurality of backend systems such as various document management systems, or file storage systems. In a preferred embodiment, the e-mail server is incorporated into the document manager server 40.

The e-mail server can include, but is not limited to, Lotus Notes™ e-mail server, Microsoft Exchange™ e-mail server, and SMTP ("Simple Mail Transfer Protocol") e-mail servers. In a preferred embodiment, the fax server is the Captaris' RightFax™ server. However, other suitable fax servers may be implemented in accordance with the present invention. The file format conversion system can be configured to convert a document from one format (e.g., TIFF, "Tag Image File Format") to another (e.g., PDF, "Portable Document Format"). An example of a document management system is disclosed in U.S. Application Ser. No. 09/795,438, filed Mar. 1, 2001; and in U.S. application Ser. No. 10/116,162, filed Apr. 5, 2002, the entire contents of which are hereby incorporated by reference. Other document management systems include systems that specialize in managing documents having a specific content. As an example, the document management systems could be the system implemented by the Centers for Medicare & Medicaid Services for managing medical and insurance records as provided under the Health Insurance Portability and Accountability Act (HIPAA). Documentum is an exemplary brand of a digital file management system used to manage, store and perform other various file management operations on stored document/record/multimedia files. Other systems for managing and/or storing documents, such as legal, financial, marketing, scientific, educational, can be connected to the document manager server 40.

As stated above, the document management server 40 is capable of supporting a plurality of such systems simultaneously. As will be described later, a profile can be configured to support multiple systems via software plug-ins and the image processing devices 10, 20, 30 capabilities and user interface can be customized based on these plug-ins.

These applications can be grouped, for example in Groups I-III. Group I can be a delivery system group including an e-mail server and a fax server; Group II can be a middle processing group including a file format conversion system and an optical character recognition system; and Group III can be a backend system group including a document management system and a file storage system. Groups I-III can include a plurality of devices from each category. For example, the document management server 40, can be connected to a plurality of applications from each Group. The document manager server 40 can direct documents to several applications within each group. In a preferred embodiment, the document manager server 40 delivers a document to several of the applications within the delivery system group, but delivers the document to one or a plurality of the application within the middle processing group and to one or a plurality of the applications of the backend system group. For example, the document manager server 40 can deliver a document to the e-mail and fax servers, to the OCR system, and to a document management system. Other combinations are possible in other embodiments.

In a preferred embodiment, the MFDs 10-30 and the document manager server 40 exchange data using the protocol HTTP ("Hypertext Transfer Protocol") or HTTPS (HTTP over Secure Socket Layer) over the network 100. Other protocols such as TCP/IP, IPX/SPX, NetBEUI, or NetBIOS, for example can equivalently be used with the present invention. Preferably, the MFDs 10-30 and the document manager server 40 exchange data using the format XML ("Extensible Markup Language"). Other formats, such as HTML, can equivalently be used with the present invention.

In a preferred embodiment, the document manager server 40 can include an MFD profiler 280 (shown in FIG. 2) that manages profiles for the MFDs 10-30. The administrator of the system 5 can create, change and maintain the profiles via a profile user interface on the document manager server 40. A profile includes information (e.g., parameters) sent from the document manager server 40 to an MFD. Based on this information, the MFD can adjust its user interface and functions so as to properly interface with the document manager server 40. The information may also include software plug-ins processed by the MFD to allow the operation of the MFD to be modified based on the existence or introduction of a backend system. The document manager server 40 includes software plug-ins corresponding to the backend applications connected to the document manager server 40. For example, the MFD can display selections allowing a user to select options (e.g., a particular delivery system, a middle processing system, or a backend system) available to the MFD via the document manager server 40. Information included in the profile can be the identity of the various applications 70-90 connected to the document manager server 40. The profiler 280 receives identification information from an MFD (e.g., the serial number) and uses this identification information to check whether the MFD is registered within a register, e.g., a data table stored in a memory of the document manager server 40. If registered, the profiler sends the MFD a profile assigned to the MFD. If the MFD is not registered, the profiler can register the MFD and send the MFD a profile. The profiler can store more than one profile. In a preferred embodiment, one profile is assigned to each MFD, and more than one MFD can share the same profile. While the term "software plug-in" has been used, any type of software, programming, or chip can be used to modify the operation of the MFD.

Examples of parameters in a profile include, but are not limited to:
- a profile ID, which identifies the profile;
- an LDAP Enabled parameter, which indicates whether or not the LDAP tree search is enabled on the document manager server 40 using the directory server 60;
- a Base Domain Name (DN) parameter, which provides a default field of search for the LDAP tree when the LDAP search is enabled;
- a Network Authentication parameter, which indicates whether or not network authentication is enabled using the network domain controller 40;
- a Time-Out parameter, which indicates the time period that should elapse before the MFD resets and requires the user to enter login information;
- a Max Result Count parameter, which determines the maximum number of LDAP query results returned;
- a Fax Option parameter, which indicates whether or not a fax server is connected to the document manager server 40;
- a Post Scan Processing parameter, which indicates what post scan processing system is connected to the document manager server 40, post scan processing systems may include, for example an e-mail server, a file format conversion system, an optical character recognition system, etc.;
- a Backend parameter, indicating which backend systems are connected to the document manager server 40 and are able to be accessed by the MFD, such backend systems may include, a document management system or a file storage system, or another similar type of system; and
- a Software Plug-in, exemplary code for which is depicted in FIG. 7, which contains and executable file allowing the image processing device to perform specific processing tasks related to a backend application.

Other parameters can also be included in the profile. For example, parameters reflecting specific user ID, default size of papers, scanning resolution setting, condition of the document feeder, department code for billing image processing operations, additional scanning job parameters for the specific user ID, or any additional parameters may be used.

The Backend parameter might also indicate if a user is required to log-in to the backend system after the user has already logged into the network. Further, the backend parameter could also initiate an authentication step to determine if a user has already logged into the network and been automatically authenticated to operate the back-end system based on the network authentication. If the backend parameter indicates that a software plug-in is required for the MFD device to properly interface with the backend application, then the MFD transmits data to the document manager server 40 requesting the receipt of a software plug-in.

FIG. 2 illustrates an MFD 20's browser 25 configured to exchange information between the MFD 20 and the document manager server 40 according to one embodiment of the present invention. An example of a browser 25 is disclosed in U.S. application Ser. No. 10/243,643, filed Sep. 16, 2002, the entire content of which is hereby incorporated by reference. Further details of the browser 25 are set forth below. FIG. 2 shows the software components of the document manager server 40, which includes an authentication device 260 configured to perform the authentication functions discussed above. The document manager server 40 also includes an administration device 265 which allows the system administrator to administer the system 5. For example, the administrator of the system can access the profiler 280 via the administration device 265 to set user profiles and/or the MFD profiles for the MFDs 10-30 connected to the document manager server 40. A directory gateway 270 is also included within the document manager server 40 and is configured to communicate with the directory server 60. The document manager server 40 also includes a document router 275 configured to route the documents received from the MFDs to the appropriate applications 70, 80 and 90.

As shown in FIG. 2, the MFD 20 includes an engine control service (ECS) 200 that controls, for example, the scanning engine of the MFD 20. A memory control service (MCS) 205 controls access to the memory of the MFD 20. An operation panel control service (OCS) 215 generates outputs which are displayed on the touch-panel type liquid crystal display (LCD) of the MFD 20. It should be noted that the display and user interface of the MFD 20 is not limited to an LCD display, but may also be any other suitable device, or combination of devices, such as but not limited to LCDs, light-emitting diode (LED) displays, cathode ray tube (CRT) displays, plasma displays, keypads, and/or keyboards. The OCS 215 can generate, for example, conventional menus for MFD operation and the menu shown in FIG. 3A-3D. A system control service (SCS) 225 controls and/or monitors sensors within the MFD 20. For example, the SCS 225 controls the touch screen sensors, paper jam sensors and scanning operation sensors. Accordingly, the SCS 225 can manage the status of the MFD 20 based on the information from the sensors. A network control service (NCS) 220 controls communication between the browser 25 and the document manager server 40. Optionally, a secure socket layer (SSL) 230, in the form of a communication formatting device or routine, provides added security for communications between the NCS 220 and the browser 25. A command input service (CIS) 240 processes input information, for example, from the LCD touch panel and/or a keypad of the MFD 20. A user of the MFD can enter information and commands using the LCD touch panel and the keypad. The CIS 240 can process such information and commands entered by a user (e.g., forwarded to the CIS 240 by the SCS 225). The CIS 240 can generate a command (e.g., a display command) based on such processing and transmit the command to other components of the MFD (e.g., to the OCS 215 to display a graphic on the LCD). The CIS 240 can also exchange information and commands with the NCS 220 for processing with the browser 25 in connection with the server 40.

Conventional MFDs include ECSs, MCSs, OCSs, NCSs, SCSs, and CISs which are firmware for implementing and controlling each hardware component of the MFD. In the present invention, however, the NCS 220 is configured to communicate with the browser 25. For instance, the NCS 220 has additional capabilities for communicating using the HTTP protocol. The NCS 220 is also configured to communicate with the server 40 so that the NCS 220 exchanges data between the browser 25 and the server 40. For example, The NCS 220 can transmit to the server 40 an identification and receive a profile, can transmit a request for an e-mail address and can receive from the server 40 a selected e-mail address, or the NCS 220 can transmit to the server 40 login information and can receive a user authentication confirmation from the server 40 (and from the directory server 60) during an authentication process. The NCS 220 is also capable of receiving plug-in information from the document manager server 40 which is capable of initiating the authentication procedure described above or altering the user interface described in FIGS. 3A-3D.

The browser 25 includes an HTTP command processor 235 that communicates with the network control service (NCS) 220 of the MFD 20. For example, a request for an e-mail address entered by the user via the MFD keypad, or a request for displaying information on the LCD, such as FIG. 3A-3D, can be passed from the NCS 220 to the browser 25 by the HTTP command processor 235. The HTTP command processor 235 can exchange data in the HTML format with the browser's HTML parser 250, and can exchange data in the XML format with the XML parser 255. The parsers 250 and 255 can check the data from the HTTP command processor 235 for syntax and process the data for HTTP command processor 235. The present invention can include conventional parsers, which are conventionally included as part of a compiler.

The HTTP command processor 235 can be provided with a program code, or software plug-in, for implementing a specific application, such as user authentication processing which can be implemented with the directory service of the server 40. The HTTP command processor 235 can process information based on definitions of the specific application. For example, the HTTP command processor 235 can process information provided by the user, such as User Name or Password, and generate an HTTP request based on this processing for the server 40. The HTTP command processor 235 can transmit this HTTP request to the NCS 220 to be transmitted to the server 40. The HTTP command processor 235 can also receive plug-in information relating to specific back-end system functionalities. These plug-ins allow for users to add processing instructions, Metadata, and other indexing information to the image file transmitted to the document manager server 40.

The HTTP command processor 235 can also process information received from the server 40 (via the NCS 220). For example, the HTTP command processor 235 can receive an HTTP response generated by the server 40 which includes a profile with parameters or software plug-ins for operating the MFD. The HTTP command processor 235 can process this information and generate commands to control the MFD in accordance with the information, e.g., can request the MFD to display a menu with the appropriate buttons, or to scan according to the scanning job parameters for the specific user ID. As another example, the HTTP command processor 235 can generate a graphic drawing command for the LCD panel. The HTTP command processor 235 can transmit the commands to the appropriate MFD firmware (e.g., the OCS 215) to be executed. For example, the OCS 215 can receive the graphic drawing command and execute it by displaying a graphic (e.g., FIG. 3A-3D) on the LCD panel.

FIG. 3A-3D illustrates examples of user interfaces 300-303 for providing instructions to the user and touch sensitive buttons, for example, buttons 305-330, for providing user input to the system shown in FIG. 1. As described above, the user interface 300-303 is preferably an LCD touch panel, although any combination of displays and input devices can be used, such as but not limited to LCDs, LEDs, CRTs, plasma displays, keypads, and/or keyboards.

FIG. 3A depicts a user interface 300 which is displayed upon the initiation of user login, or when tab 305 is selected by the user. The "Login" user interface 300 includes a prompt allowing the user to enter a login "User Name" 311, "Password" 312, and "Domain" 313 corresponding the to network domain the user intends to access. The user is also presented with the button "Login" 350, which, when selected, initiates submission of the user username and domain name to the network domain controller 50 though the document manager server 40. A "Reset" 355 button is also presented that, when selected, clears the data that the user has entered in each of the fields. The purpose of specifying a domain name is to allow the user to log on to a specific network for which specific services or connectivity may be provided to the user.

Figure 3B:
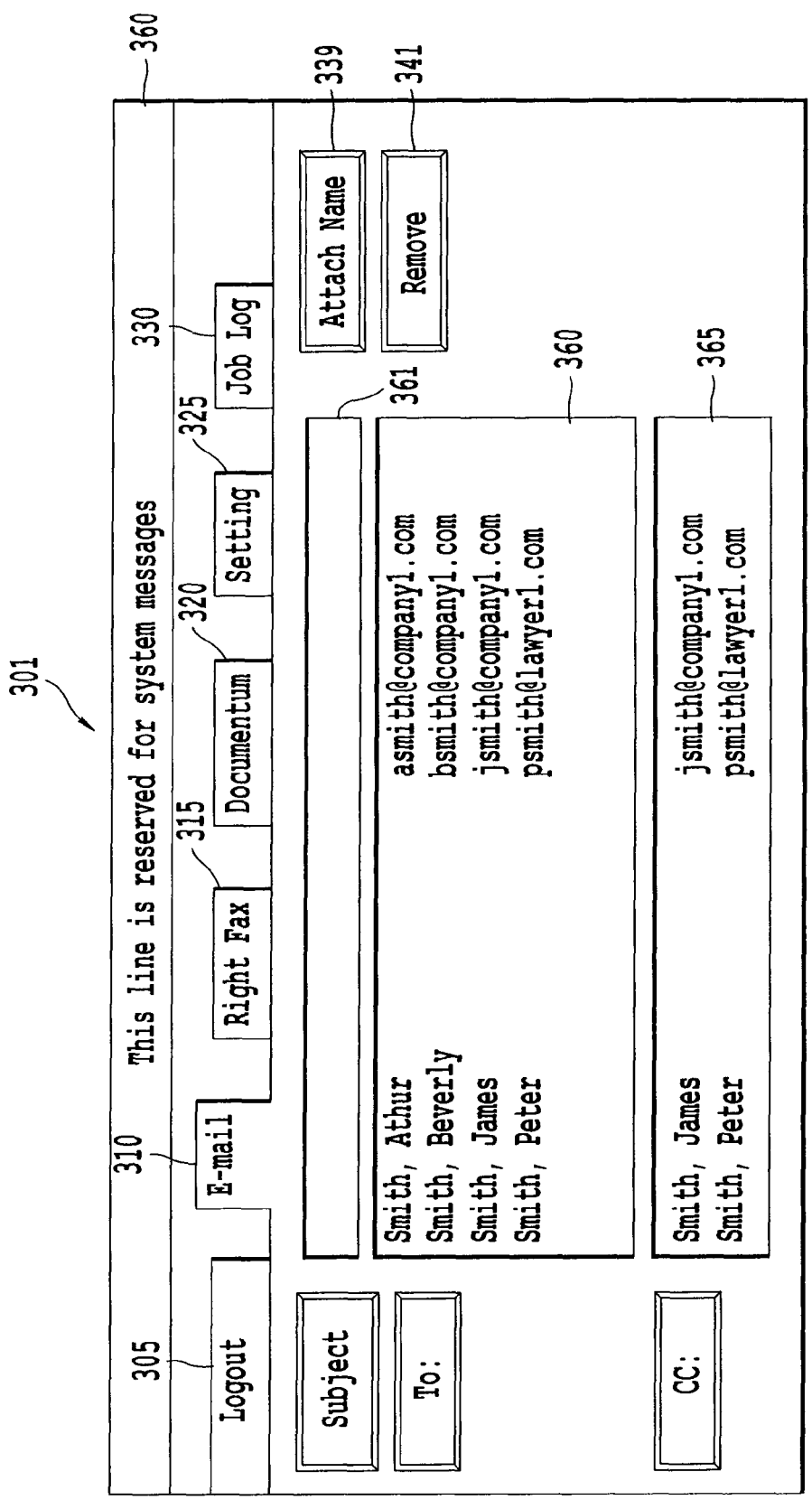
FIG. 3B shows an example of a scan to e-mail user interface displayed on an image processing device according to one embodiment of the present invention.

When the user selects tab 310, the MFD displays a user interface 301, depicted in FIG. 3B, that permits the user input pertinent information allowing a user to e-mail a processed image. When the user selects tab 315, the MFD displays a user interface 302, shown in FIG. 3C, that allows the user to input information for transmitting a processed image by facsimile. When the user selects the "Documentum" tab 320, the MFD displays a user interface 303, as depicted in FIG. 3D, that permits the user to input specific parameters and enable specialized authentication procedures relating to specified back-end applications. It should be noted that Documentum is described as one example of a backend system, however various additional user interfaces for specific backend systems may also be customized and displayed similarly. Upon selecting tab 325, the MFD displays a user interface allowing the user to enter settings for scanning a document. When the user selects tab 330, the MFD displays a user interface displaying a job log, which keeps track of parameters relevant to previous jobs performed by the MFD.

The user interfaces 300-303 depicted in FIGS. 3A-3D, also include a system display portion 360 for displaying system messages, such as time and date, error messages or instructions to the user. For example, an error message will be displayed if the user is unable to be authenticated to a network or application. The user interface 300-303 may be configured in a number of ways, based on the applications available to the user of the MFD.

FIG. 3B illustrates the user interface 301 displayed when the user selects the "E-mail" tab 310. The user interface 301 includes a "Subject" line 361 enabling the user to enter a subject of the e-mail transmitted by the user. The interface further includes "To:" 360 and "CC:" 365 fields in which the e-mail addresses of the intended recipients of e-mail are displayed. A "BC:" or "BCC:" field may also be displayed and edited by the user. The user interface 301 also includes the "Attach Name" 339 and "Remove" 341 buttons to easily modify and edit the e-mail addresses to which the message will be sent. A "Logout" tab 306 is also included in the user interface 301, which allows the user to logout and terminates the image processing.

Figure 3C:
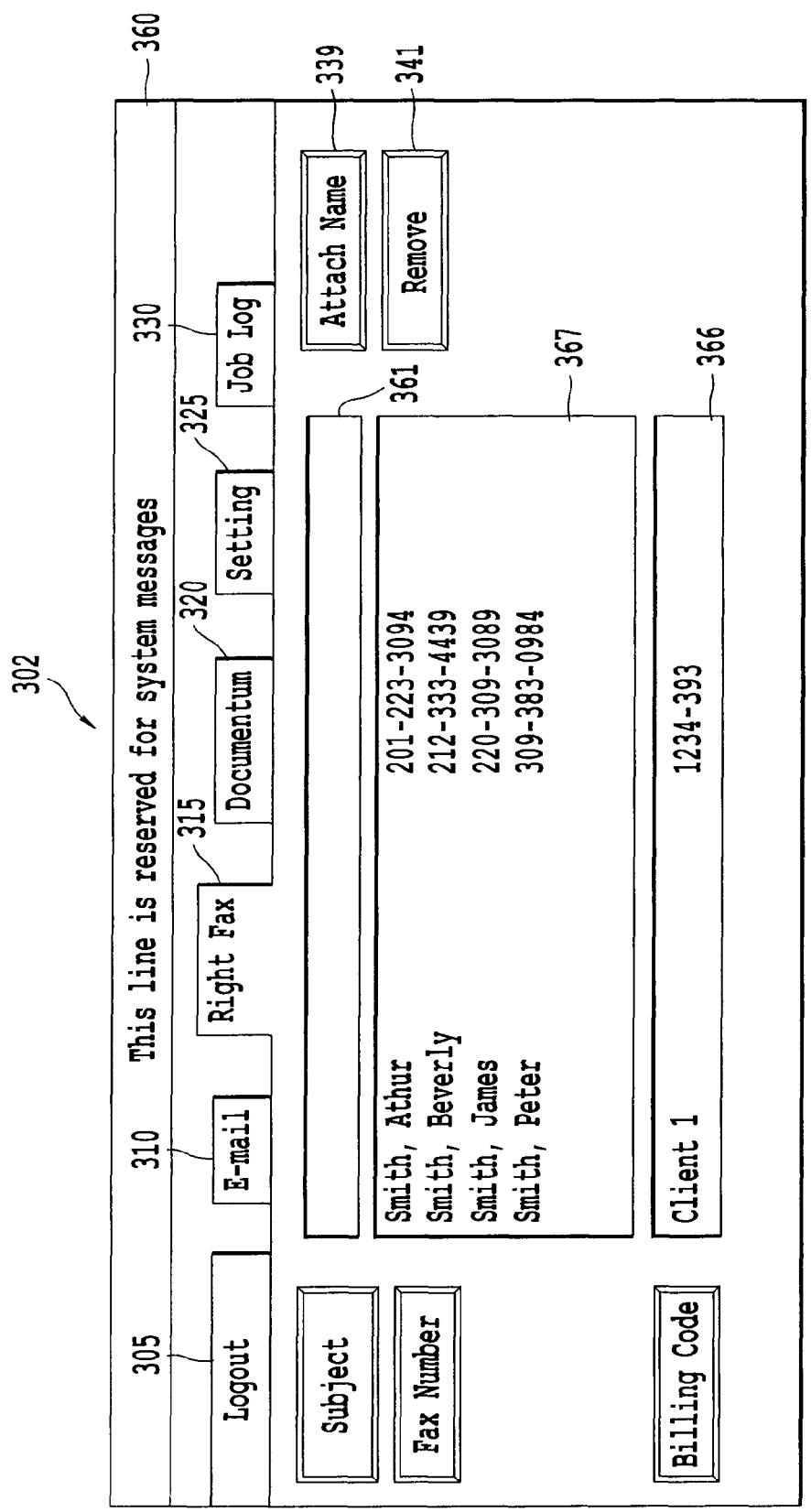
FIG. 3C shows an example of a scan to e-mail user interface displayed on the image processing device according to one embodiment of the present invention.
Figure 3D:
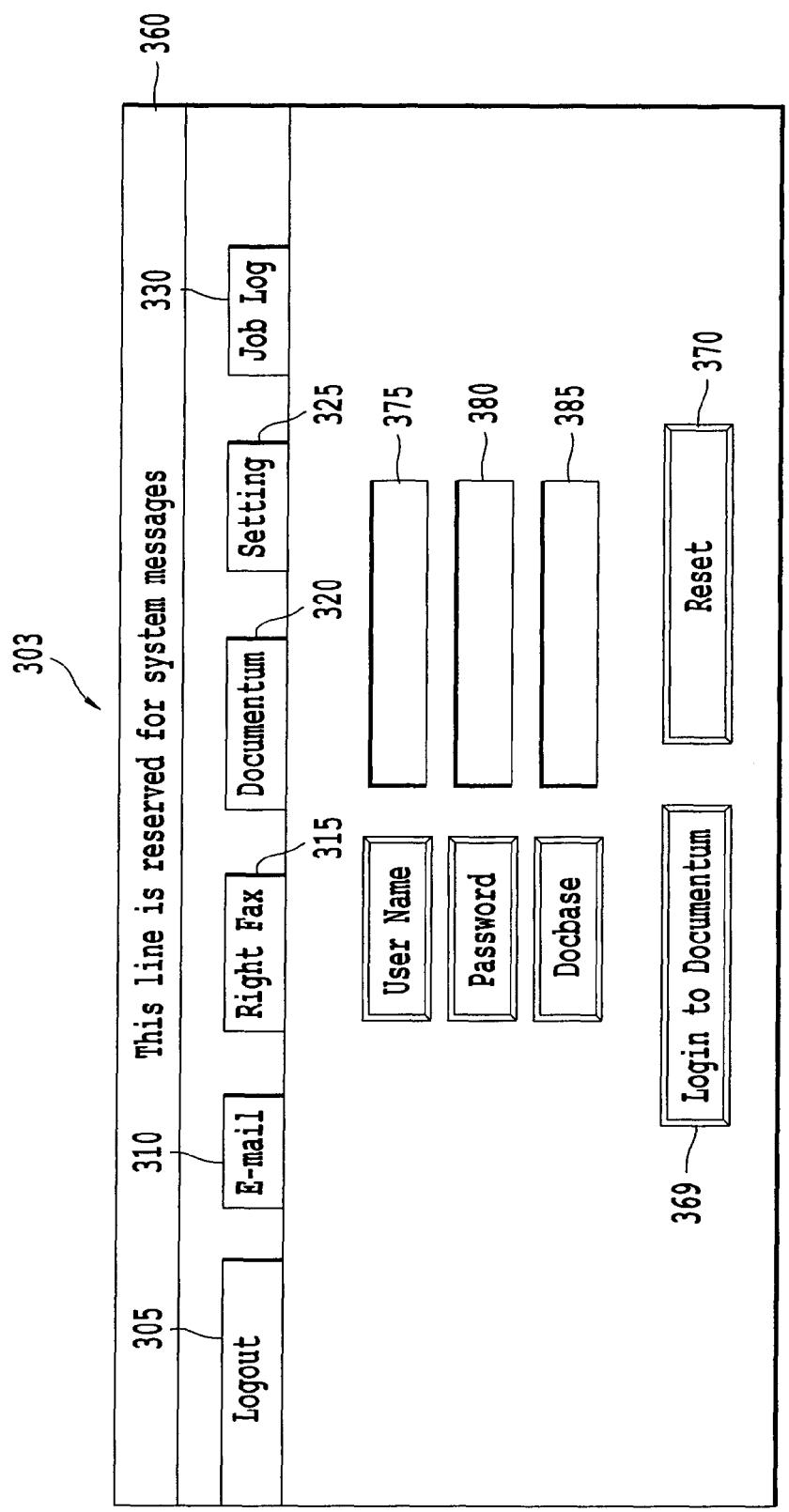
FIG. 3D shows an example of a scan to backend system user interface displayed on the image processing device according to one embodiment of the present invention.

FIG. 3C illustrates a user interface 302 displayed when the user selects the "Right Fax" tab 310. Right Fax is described as an exemplary embodiment of facsimile processing server, however any other suitable facsimile processing server may be similarly implemented. The facsimile user interface 302 is similar to the e-mail interface depicted in FIG. 3B, but includes a "Billing Code" field 366 instead of the "CC:" field 365 and a "Fax Number" field 367 instead of a "To:" field 360. The "Billing Code" field can be used to enter a billing code associated with a job being processed and may be stored in a database to properly track billing information of faxed jobs. A "Logout" tab 306 is also included in the user interface 302, which allows the user to logout and terminates the image processing. The process of sending transmitting a facsimile will be described in greater detail below in reference to FIG. 9.

FIG. 3D illustrates the user interface 303 displayed when the user selects the "Documentum" tab 320. Documentum is an exemplary brand of a digital file management system used to manage, store and perform other various file management operations on stored document/record/multimedia files. When the user selects the "Documentum" tab 320, a user interface is displayed prompting the user to log into the "Documentum" system. The user interface 303 includes prompts for a "User Name" 375, "Password" 380, and "Docbase" 385. The system also includes the buttons "Login to Documentum" 369 and "Reset" 370. The "Login to Documentum" button initiates the transmission of the user's login information to the Documentum system allowing the user to be authenticated and gain access to the Documentum system. Once the user gains access to the Documentum system documents can be stored to specific locations, documents can be retrieved to be printed, and retrieved documents can be e-mailed to specified recipients. Other functions can also be performed based on the backend application selected. A "Logout" tab 306 is also included in the user interface 303, which allows the user to logout and terminates the image processing. It should be noted that "Documentum" is portrayed as an example of a backend system, but any other backend application could also be handled similarly. Also, it should be noted that the user interface is able to be customized so as to contain more or less user options depending on how many backend applications are supported. The process of sending transmitting a scanned image to a backend system will be described in greater detail below in reference to FIG. 8.

FIGS. 4A, 4B and 5-11 are flowcharts depicting steps performed in the methods used to manage documents with the document manager server 40 according to various embodiments of the present invention.

Figure 4A:
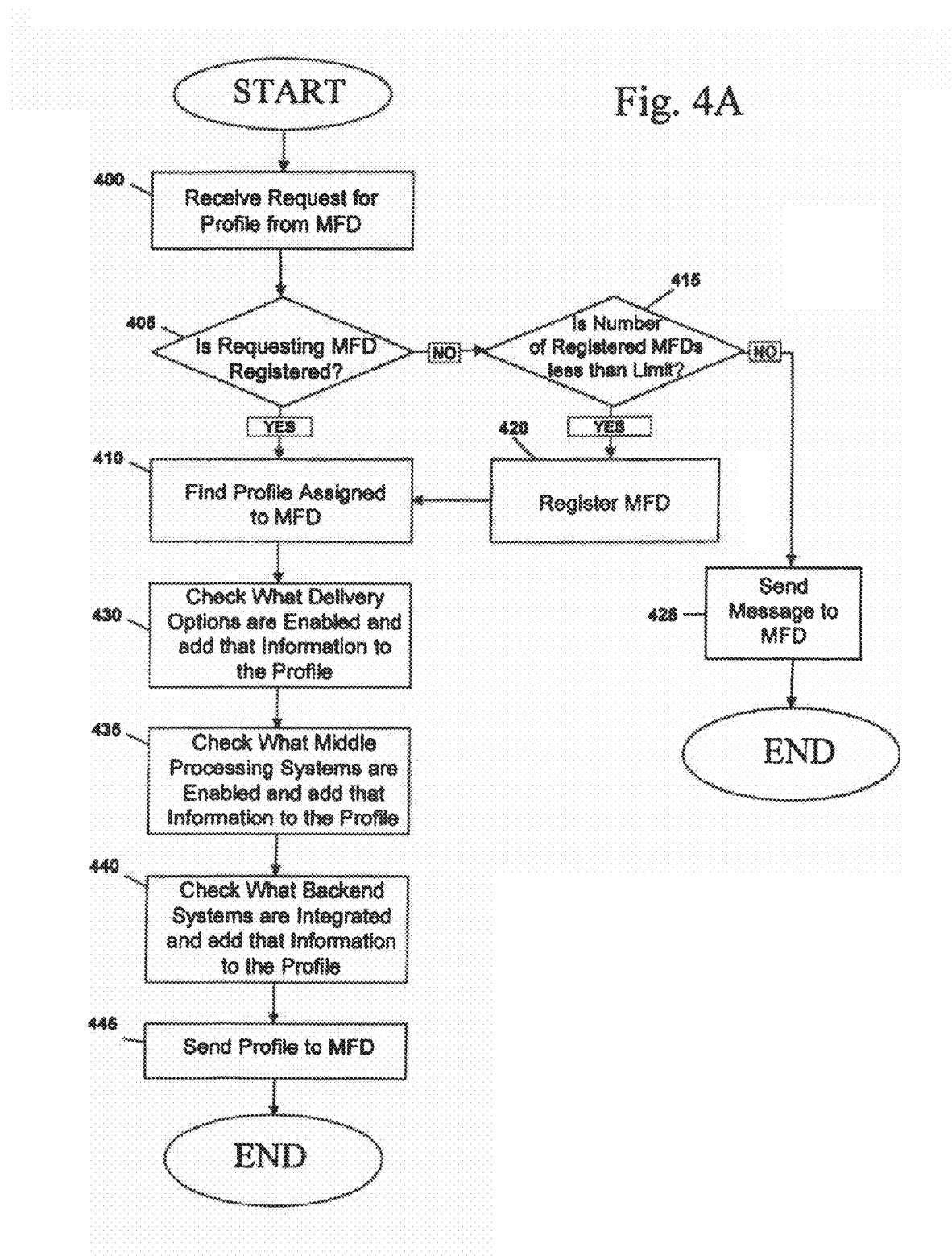
FIG. 4A is a flowchart illustrating the steps by which a multi-function device obtains profile information according to one embodiment of the present invention.

The process shown in FIG. 4A illustrates a method performed by the document manager server 40. At step 400, the document manager server 40 receives a request for a profile from an image processing device or MFD. This request can include identification information identifying the requesting MFD. The identification information can include the serial number of the MFD and/or group identification for the MFD, or other identification information. A group identification can be for example an indication that the MFD belongs to a specific division with an organization, the group having a specific function, for example legal, accounting, marketing, or having a specific location, for example a floor, a building, a town, a state, a country, or having a specific security level, etc. Alternatively, the identification information can allow the document manager server 40 to look up further identification information, such as the division, group, or any other additional information, as specified above.

At step 405, the document manager server 40 inquires whether the MFD is registered, for example by looking up the identification information in a register that stores registered MFDs. If the MFD is registered, the document manager server 40 finds a profile assigned to the MFD at step 410. If the MFD is not registered, the document manager server 40 can compare at step 415 the number of registered MFDs with a predetermined number. This predetermined number can be for example the maximum number of devices licensed to use a particular application connected to the document manager server 40. This predetermined number (and information identifying its associated application) can be stored at the document manager server 40, and can be for example, 5, 25, 100, or any desired number, depending on the license agreement between the network application and the organization benefiting from the MFDs. License information can also be included in MFD profiles so that the MFD can change its user interface and functions accordingly. If the number of registered image processing devices is less than the predetermined number, the document manager server 40 can register the MFD at step 420 and find a profile assigned to the MFD at step 410. If the number of registered image processing devices is equal to the predetermined limit, the document manager server 40 can transmit a message to the MFD at step 425. The message can be an error message indicating that the services available to the document manager server are not available to the MFD because the maximum number of licensed MFDs is reached.

At step 430, the document manager server 40 determines the delivery options, e.g., fax server, e-mail server, are available and adds this information to the profile. At step 435, the document manager server 40 determines the middle processing systems are available and adds this information to the profile. At step 440, the document manager server 40 ascertains the available backend systems and adds this information to the profile. This step optionally includes the attachment of a plug-in allowing the MFD to implement customized functions which allow it to operate with specific backend systems. At step 445, the document manager server 40 sends the profile and any plug-ins to the registered image processing device.

The document manager server 40 can repeat the above steps for several image processing devices. If the image processing devices belong to the same group within an organization, the document manager server 40 can transmit the same profile to each of the image processing devices. After the MFD has received its profile from the document manager server 40, the MFD can create an initial display user interface based on the various parameters provided in the profile and corresponding plug-in, as discussed next with FIG. 4B.

Figure 4B:
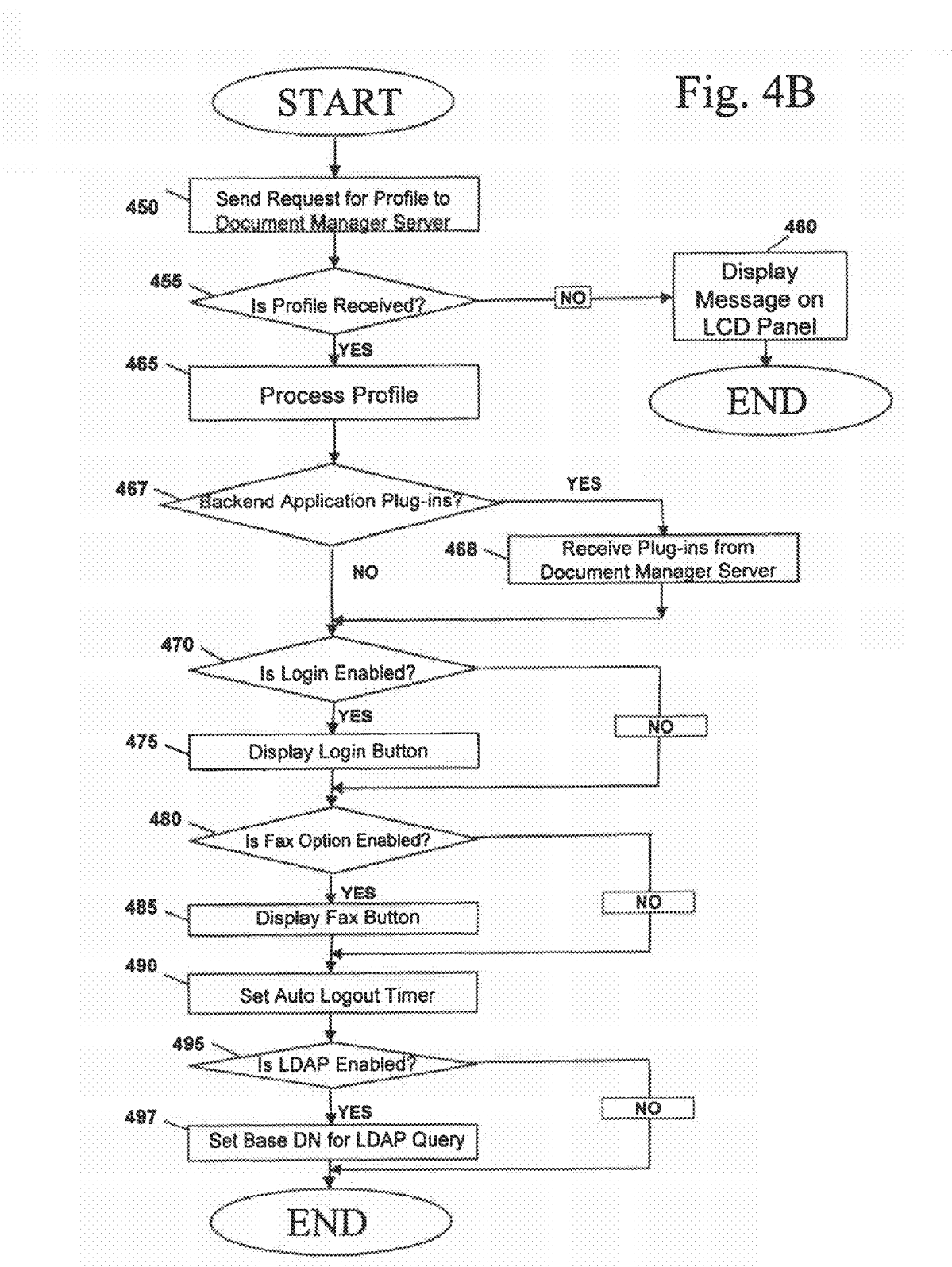
FIG. 4B is a flowchart illustrating the steps performed by the multi-function device upon receipt of the profile information according to one embodiment of the present invention.

The process shown in FIG. 4B illustrates a method performed by an image processing device, e.g., an MFD, and can start, for example, when the image processing device is turned on. At step 450, the MFD sends a request for a profile to the document manager server 40. As noted above, this request can include identification, such as the serial number of the image processing device. At step 455, the MFD inquires whether the profile has been received from the document manager sever 40. If no profile has been received but instead an error message was received from the document manager server 40, the MFD displays a message at step 460. If the profile is received, the MFD processes the profile received at step 465. Then at step 467 the MFD determines if backend application requiring software plug-ins are enabled by the received profile. If software plug-ins are required, at step 468 the MFD transmits a message to the document managers server, and the document manager server transmits the required plug-in to the MFD. The plug-ins can be used by the MFD to assist in creating or customizing the user interfaces 3A-3D required to interface with available backend systems. It should be noted that the software plug-in may also be received in coordination, or simultaneously, with the profile information or at any other time. As part of this processing, the MFD can generate displays as a function of the profile parameters. For example, the MFD can generate specific menus or user interfaces based on the backend and middle processing systems identified in the profile. These user interfaces or menus may be generated from additional plug-in information corresponding to the backend and middle processing systems received at the MFD from the document manager server. This step of customizing the user interface based on received profile and plug-in information prevents the MFD from presenting a user interface, or menu option, to a user corresponding to a backend or middle processing system for which the user or MFD is not permitted access. At step 465, the MFD can also display graphics on its LCD based on default settings.

The parameters provided in the profile can correspond to functions that are optional for the MFD. Other functions are enabled by default within the MFD so that the MFD displays graphics corresponding to available functions automatically without inquiring whether the profile indicates that these default functions are enabled. Parameters corresponding to such default functions need not be part of the profile. In the example illustrated in FIG. 4B, the login, fax, and LDAP functions are optional so that the MFD inquires about their enablement by considering the parameters included in the profile. Also in this example, the e-mail function is enabled by default so that the MFD does not inquire about these functions. The present invention is not limited to this example and other combinations of optional/default functions are within the scope of the present invention.

At step 470, the MFD inquires whether its profile indicates that the login function is enabled. If the login function is enabled, the MFD displays a login button on its LCD panel at step 475. If the login function is not enabled, the MFD skips to step 480 where it inquires whether its profile indicates that the fax option is enabled. If the fax option is enabled, the MFD displays or enables a fax tab 315 on its LCD at step 485. If the fax option is not enabled, the MFD skips to step 490 where it sets an MFD auto logout timer based on a timer value provided in the profile.

At step 495, the MFD inquires whether its profile indicates that the LDAP option is enabled. If the LDAP option is enabled, at step 497 the MFD sets a base Distinguished Name (DN) for an LDAP query provided as part of the profile. The base DN provides a default field of search within which the LDAP search is performed unless a narrower field of search is requested. If the LDAP option is not enabled, the MFD skips the step 497. After performing these steps, the MFD has completed an initial user interface for the MFD, such as user interfaces illustrated in FIGS. 3A-3D. The present invention is not limited to the order of the steps shown in FIGS. 4A-B.

Using this initial user interface and other menus displayed by the MFD, the user of the MFD can access the various services available on the network through the document manager server 40. In general, the document manager server 40 receives job information from the image processing device; processes the job information at the document manager server 40; and transmits processed information to an application connected to the document manager server 40.

FIG. 5 illustrates a method of authenticating a user according to one embodiment of the present invention as performed by the MFDs 10-30. At step 505, the MFD inquires whether a command is received from the user to display a login user interface. For example, the user can press a login button on the LCD of the MFD 20, such as the "Login" button 305 of user interface 300 shown in FIG. 3A. At step 510, the MFD 20 displays the login user interface if the command is received. At step 515, the MFD 20 inquires whether the login information is received from the user. For example, the MFD 20 can inquire whether the user entered a user name, a password, and a domain name.

Once the login information is received, the MFD 20 sends the login information to the document manager server 40 at step 520. The document manager server 40 receives the login information, processes it and transmits the processed login information to the network domain controller 50. The domain controller 50 verifies the login information and sends an authentication confirmation to the document manager server 40 that forwards the confirmation to the MFD 20. At step 525, the MFD 20 inquires whether the authentication confirmation is received from the document manager server 40. Once the MFD 20 receives the user authentication, the MFD 20 downloads from the document manager server 40 a user's homepage for display at step 530. The user's homepage can be a default (portal) page initially displayed after authentication. In the present invention, this homepage can be generated based on the result of user authentication, and corresponding plug-ins received in conjunction with the received profile information. While the term "homepage" has been used, the invention can display any desired information. In a preferred embodiment, the user homepage can be provided with a "Help" button, and/or an "About" button to provide instruction and information for using system of the present invention. The user is also able to login to back-end applications from the MFD 20 as will be described subsequently.

Figure 6:
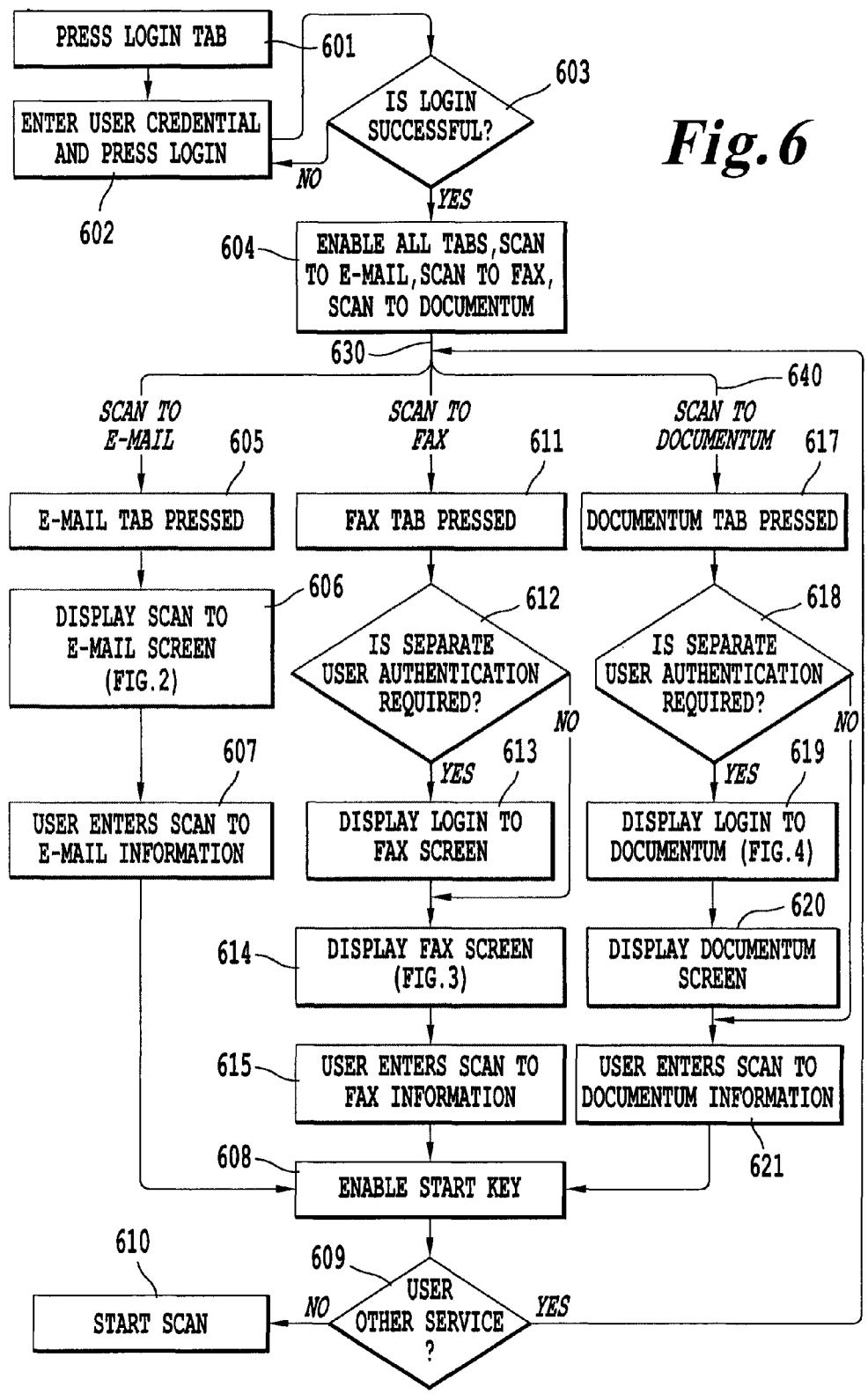
FIG. 6 is a flowchart illustrating a user authentication process for additional network applications after the user has logged into a network according to one embodiment of the present invention.

FIG. 6 illustrates a method for the user authentication of the MFD 20 after the user has already initially logged into a network domain. At step 601 the user initiates a network login procedure as shown in FIG. 5 by pressing the "Login" tab. The user then enters login information at step 602 and initiates a transfer of the login information, as described above in FIG. 5. If the login is successful at step 603 the document manager server transmits profile, plug-in, and other necessary information in step 604 to the MFD 20 so that the user's customized interface is displayed including the tabs as described in relation to FIGS. 3B-3D. Once the customized interface is displayed the user is able to select from a plurality of available options.

If the "E-mail" tab is pressed at step 605, then the process of sending an e-mail from the MFD is initiated. Once this option is selected, the user is presented, at step 606 with the user interface 301 depicted in FIG. 3B, allowing the user to modify the list of intended recipients and subject of the transmitted e-mail at step 607. Once the user enters the appropriate information, the start key is enabled on the MFD 20 at step 608 and the user is able to initiate the scanning and subsequent e-mailing of the image. The user is then prompted at step 609 with an option to perform further processing operations. If the user desires additional processing, the process returns to step 604. If the user selects indicated that they wish to perform no further processing at step 609, and then the image processing is terminated at step 610.

If the user selects the "Right Fax" tab at step 611, the process proceeds to step 612. At step 612, the profile, associated plug-in information, and other associated information received by the MFD from the document manager server is used by the MFD to determine if another authentication process is required for access to the facsimile application. If no authentication is required, then the "Right Fax" user interface 302 is displayed at step 614. However, if user authentication is required for access to the fax application then a login user interface is displayed at step 613. Once the user enters and submits the required authentication information to the facsimile server, the facsimile server checks the user authentication against a database of registered users. If the user is authenticated by the facsimile server, then the "Right Fax" user interface 302 is displayed and enabled at step 614. However, if user authentication is unsuccessful an error message is displayed to the user, for example in the system message area 360. Once the user is authenticated, at step 615, the user is able to enter a billing code, fax numbers, subject for the transmitted fax, and any additional optional information. Once this information is entered the user initiates scanning by pressing a "Start" key, at step 608 and subsequent facsimile transmission of the image, as described below. The user is then prompted at step 609 with an option to perform further processing operations. If the user desires additional processing, the process returns to step 604. If the user selects no at step 609, then the image processing is terminated.

If the "Documentum" tab 320, or the tab representing any other backend application, is pressed at step 617, the software plug-in (or other information) received by the MFD from the document manager server 40 is used to determine at step 618, if a subsequent authentication process is required for the user to gain access to the backend system. If user authentication is required then the "Documentum" login user interface 303 is displayed at step 619. The user is then prompted to enter a "Username", "Password", and "Docbase" and transmit these parameters to the backend system. The backend system then authenticates the user against a database of registered users and determines if the user is granted access to the system. However, if user authentication is unsuccessful an error message is displayed, for example in the system message area 360, and the user is denied access to the system.

Once the user is granted access to the Documentum backend application the image can be processed by the MFD and management, storage, retrieval and other file management operations can be performed on processed images using a displayed backend application interface at step 620. The user is also able to submit indexing information, Metadata, and other customized processing information relating to the processing of the scanned image to the backend application interface at step 621. Once the user enters the appropriate information, the start key is enabled at step 608 and the user can initiate the backend processing, as described below. The user is then prompted at step 609 with an option to perform further processing operations. If the user desires additional processing, the process returns to step 604. If the user decides to terminate processing at step 609, then the image processing is terminated at step 610. The process described in relation to the Documentum application can be similarly performed, and the user interfaces similarly customized, for any other suitable backend application.

Additionally, the user of the MFD can request for the document manager server 40 to route a document to an application connected to the document manager server, such as a fax server, an e-mail server, a file format conversion system, an OCR system, a document management system and a file storage system. In this case, the job information includes the document and the request for routing the document to an application.

FIG. 7 is an example of code included in a software plug-in sent to an MFD, from the document manager server. Once the plug-in is received and processed by the MFD, the MFD can perform operations enabling a user to add specific processing instructions, index data or Metadata to the image file before it is processed by the image processing device. The software plug-in is optionally not transmitted to the MFD until the MFD receives the backend parameter and determines which backend applications are enabled by the MFD. The MFD then sends a message to the document manager server indicating that a specific backend application is enabled. The document manager server responds by transmitting the software plug-in to the MDF allowing it to perform all necessary modifications to the MFD user interface and corresponding functionalities. The plug-in also allows the MFD to make a determination regarding the type of user authentication required for the user to gain access to a particular network application. Additionally, the software plug-in enables the MFD device to determine if the user is authenticated on another system, and whether that authentication procedure allows for the user to have access to a particular application. The user interface and of the MFD may also be customized based on the information and the plug-in to allow the user access to specific functionalities for a specific backend system. These capabilities will be described in greater detail below.

Figure 8:
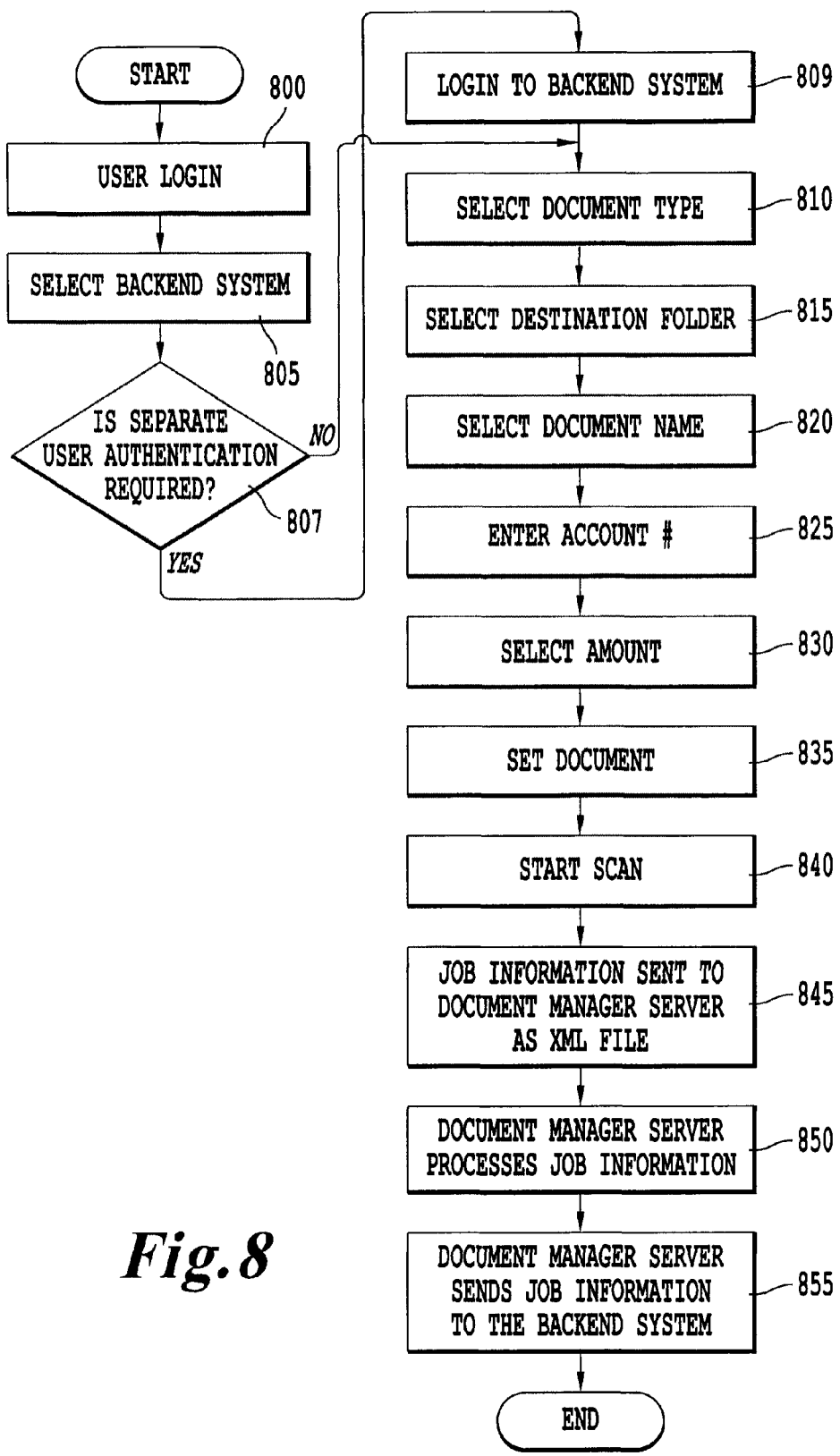
FIG. 8 is a flowchart illustrating the steps performed when sending a document to a backend system according to one embodiment of the present invention.

FIG. 8 shows an example of a method for sending a document to a backend system using an MFD though the document manager server 40. As mentioned above, the backend system can be for example a document management system or a file to scan system. At step 800, the MFD user can login to a network as discussed above in FIG. 5, and at step 805, the MFD user can select a backend system, such as a document management system. The MDF then examines the information received from the document manager server 40 (e.g. profile, plug-in, etc.) and determines at step 807 if the user is required to login to the backend system. If no user login is required then the process continues to step 810. If login is required, the user logs into the backend system at step 809, as described above in FIG. 6. At step 810, the MFD user can select a document type using the MFD input device. For example, a menu of document types can be displayed so that the user can select one of the types using the touch sensitive user interface of the MFD. The document type can be used as index information when storing the document at the backend system. At step 815, the MFD user can select a destination folder where the document will be stored at the backend system. Again, this can be performed by selecting a folder from a list displayed on a user interface, or the destination folder can be entered using a keyboard. At step 820, the MFD user can enter the name of the document and/or other indexing information. At step 825, the user can enter an account number, which can be used by the document manager server 40 and/or by the backend system for management purposes, such as billing, accounting, activity monitoring. At step 830, the user can select an amount on an invoice when the document type is an invoice. Other fields can be displayed on the MFD display in order to prompt the user to enter information (e.g., a numerical value) for different types of documents.

At step 835, the document can be set on the MFD scanning surface. At step 840, the document is scanned. At step 845, the job information is sent to the document manager server 40, for example as an XML file. The job information in this case can include the selected backend system, the scanned document, a request to route the document to the backend system, the document type, the destination folder, the document name, the account number, and the amount. At step 850, the document manager server 40 processes the job information received from the MFD. In one embodiment, the document manager server 40 sends the document to a middle processing system based on selected backend system. In other words, the document manager server 40 can recognize that the selected backend system requires a specific file format. The document manager server 40 automatically ensures that the document received from the MFD is in the proper format before sending it to the backend system. At step 855, the document manager server 40 transmits at least part of the processed job information (e.g., the document) to the backend system.

Figure 9:
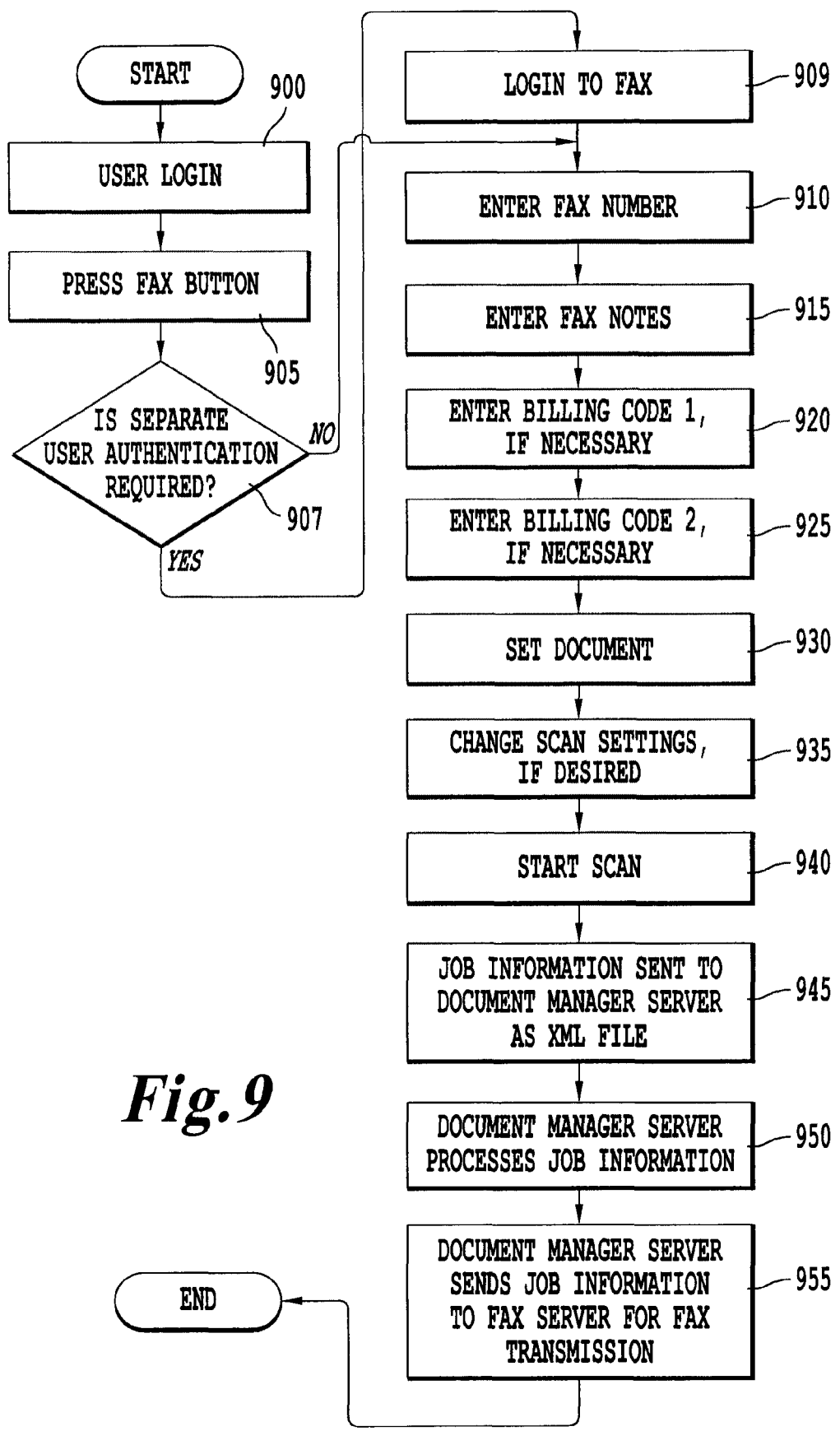
FIG. 9 illustrates the steps performed in sending a fax by way of the document manager server according to one embodiment of the present invention.

FIG. 9 shows an example of a method for sending a fax using an MFD though the document manager server 40. At step 900, the MFD user can login as discussed above with FIG. 5. At step 905, the MFD user can press a fax button, such as Fax button 315 shown in FIGS. 3A-3D. The MDF then examines the information received from the document manager server 40 (e.g. plug-in, profile, etc.) and determines at step 907 if the user is required to login to the facsimile server. If no user login is required then the process continues to step 910. If login is required, the user logs into the facsimile server at step 909, as described above in FIG. 6. If login is successful, at step 910, the MFD user can enter a fax number using an MFD input device, such as a touch screen or a keypad. Alternatively, the fax number can be displayed and selected after accessing the global directory 60. At step 915, the MFD user can enter fax notes that will be transmitted along with the faxed document. The user can enter the fax notes using the MFD input device. At steps 920-925, the user can enter billing codes if required in order to fax a document from the MFD. Whether or not the entry of a billing code is required can be determined by a profile parameter. The billing code corresponds to the entity who should be billed for the fax service.

At step 930, the document can be set on the MFD scanning surface. At step 935, the scanning settings can be changed if desired, for example by accessing a scan setting menu displayed on the user interface. At step 940, the document is scanned. At step 945, the job information is sent to the document manager server 40, for example as an XML file. The job information in this case can include the scanned document, the request to route the document to the fax server, the billing codes, the scanning parameters, and the specified fax number. At step 950, the document manager server 40 processes the job information received from the MFD. At step 955, the document manager server 40 transmits at least part of the processed job information to the fax server in order to complete the fax transmission.

Figure 10:
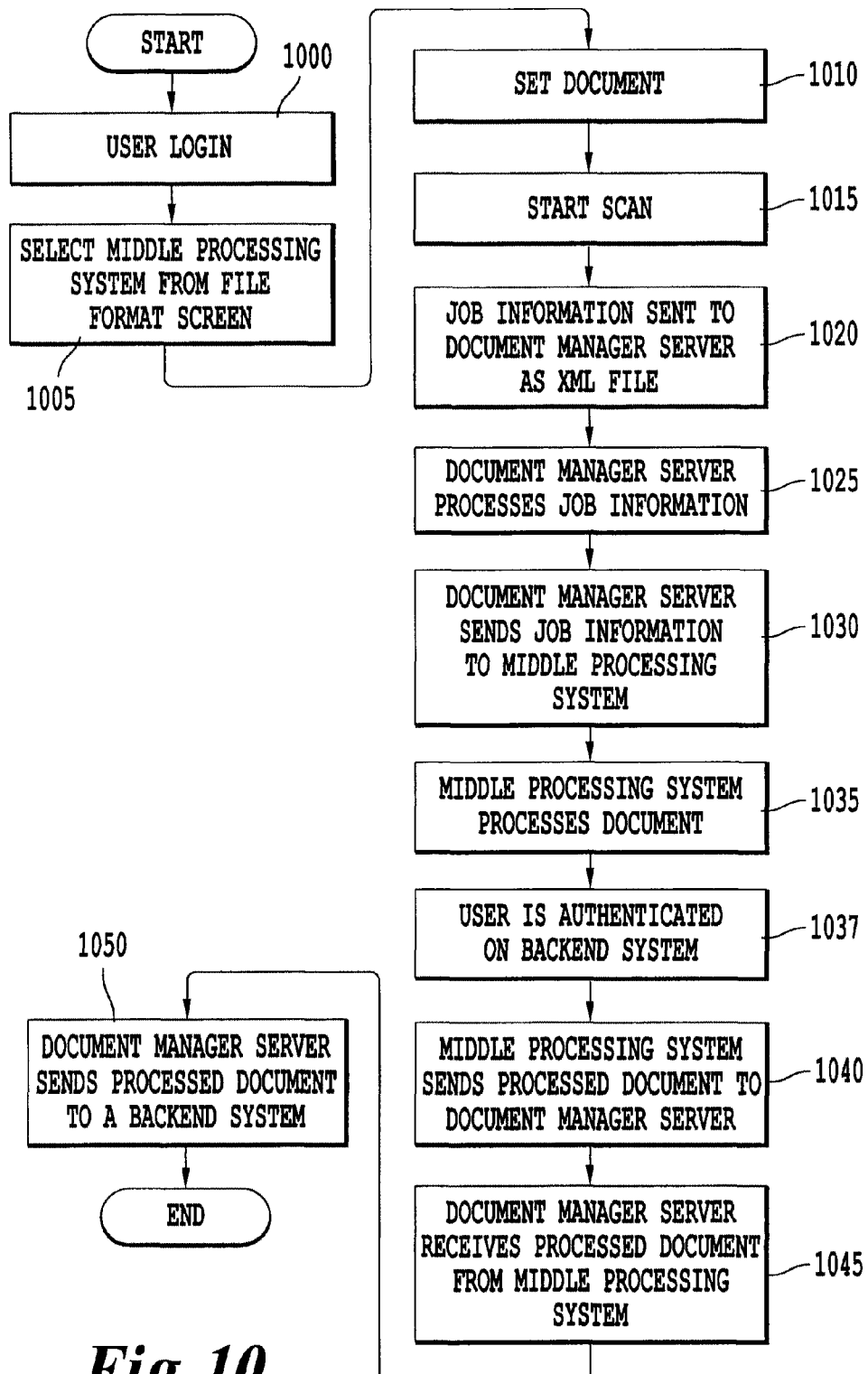
FIG. 10 is a flowchart illustrating the steps performed in sending a document, processed by a middle processing system, to a backend system according to one embodiment of the present invention.

FIG. 10 shows an example of a method for sending a document, processed by a middle processing system, to a backend system using an MFD though the document manager server 40. As mentioned above, the middle processing system can be for example a file format conversion system, or an OCR system. At step 1000, the MFD user can login as discussed above with FIG. 5. Further, in order to begin this processing step the user must have already been authenticated, if necessary, to the specified backend system as described above in FIGS. 6 and 8. At step 1005, the MFD user can select a middle processing system, such as an OCR system and/or a PDF conversion system. For example, the user can touch the button 320 (the tab is labeled "Documentum" but could be labeled accordingly for any other backend application) shown in FIG. 3A to display a file format screen from which the user can select a conversion/recognition system. In an alternative embodiment, the file format screen can be displayed automatically by the MFD based on its profile, or based on the selection of the backend system. At step 1010, the document can be set on the MFD scanning surface. At step 1015, the document is scanned. At step 1020, the job information is sent to the document manager server 40, for example as an XML file. The job information in this case can include the selected middle processing system, the scanned document, the request to route the document to the middle processing system and other systems if desired. At step 1025, the document manager server 40 processes the job information received from the MFD.

At step 1030, the document manager server 40 transmits at least part of the processed job information, such as the document, to the middle processing system. At step 1035, the middle processing system processes the document. At step 1037 an authentication step is performed to determine if user authentication is needed to process the scanned document with the backend system. If user authentication is required, the user must login to the backend system as described with FIG. 6. At step 1040, the middle processing system transmits the processed document to the document manager server 40. At step 1045, the document manager server 40 receives the processed document, and at step 1050 transmits the processed document to a backend system.

Figure 11:
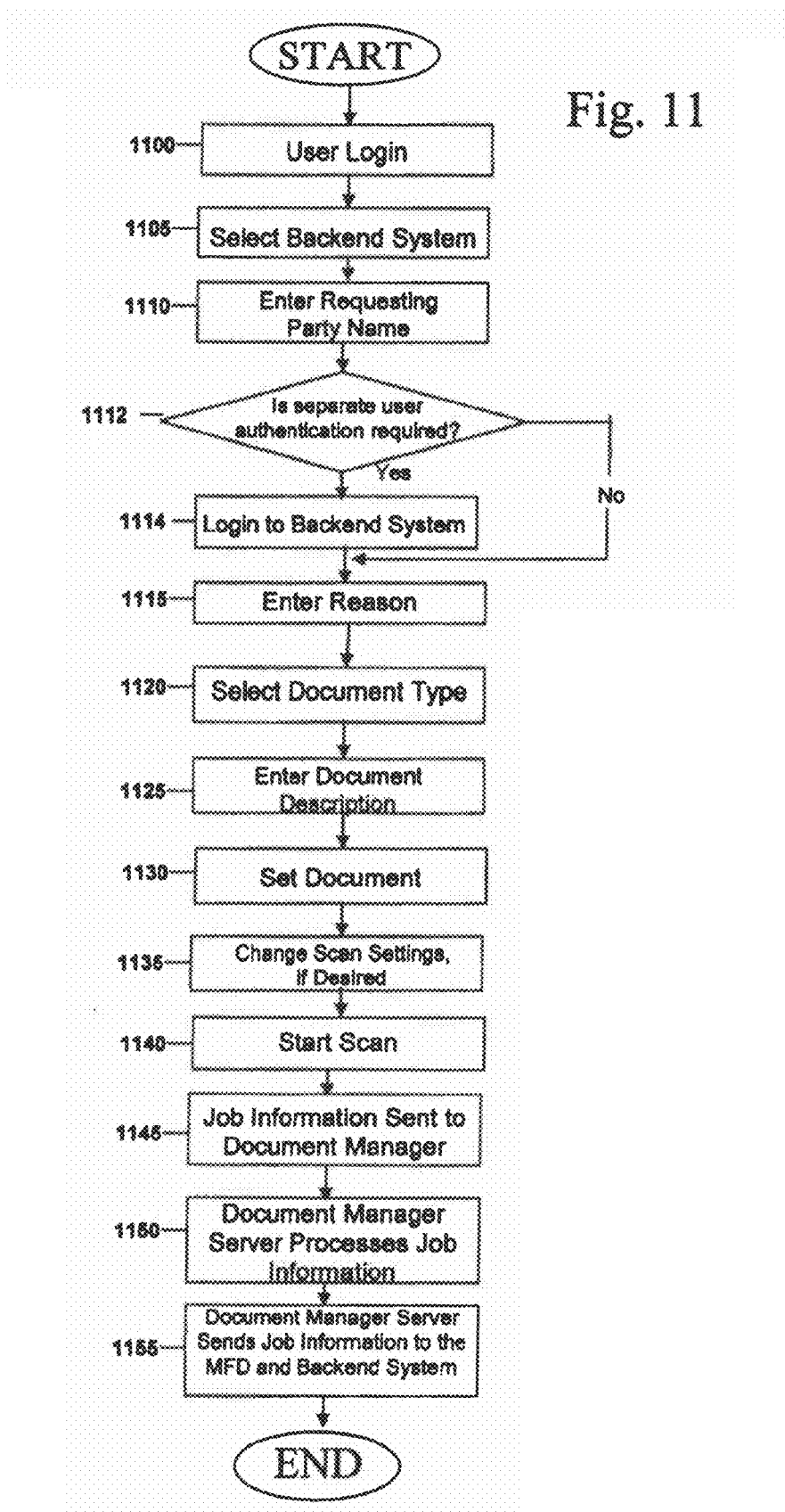
FIG. 11 is a flowchart illustrating the steps performed in a process to simultaneously send a document to a backend system and print the document according to one embodiment of the present invention.

FIG. 11 shows an example of a method for sending a document to a backend system and printing out the document at an MFD though the document manager server 40. As mentioned above, the backend system can be for example a document management system or a file to scan system. In this example, the document management system manages sensitive document, such as medical and insurance records and requires certain information to keep track of who is requesting the document and why. At step 1100, the MFD user can login as discussed above with FIG. 5. At step 1105, the MFD user can select a backend system, such as a medical record document management system. For example, the user can touch the button 320 shown in FIGS. 3A-3D. At step 1110, the MFD user is prompted to enter the name of the party requesting the document. The MDF then examines the information received from the document manager server 40 and determines at step 1112 if the user is required to login to the backend system. If login is required the user logs into the backend system at step 1114, as described above in FIG. 6. At step 1115, the MFD user can enter a reason for requesting the document. This step can be performed by selecting a reason from a list displayed on a user interface, or the reason can be entered using a keyboard. At step 1120, the MFD user can enter the document type and at step 1125, the user can enter the document description and/or other indexing information.

At step 1130, the document can be set on the MFD scanning surface. At step 1035, the scanning settings can be changed if desired. At step 1140, the document is scanned. At step 1145, the job information is sent to the document manager server 40, for example as an XML file. The job information in this case can include the scanned document, the name of the requesting party, reason for requesting the document, the document type, and the document description. At step 1150, the document manager server 40 processes the job information received from the MFD. At step 1155, the document manager server 40 transmits at least part of the processed job information to the MFD and to the backend system. For example, the document manager server 40 can send the document back to the MFD for printing, and to the document management system for storing.

Figure 12:
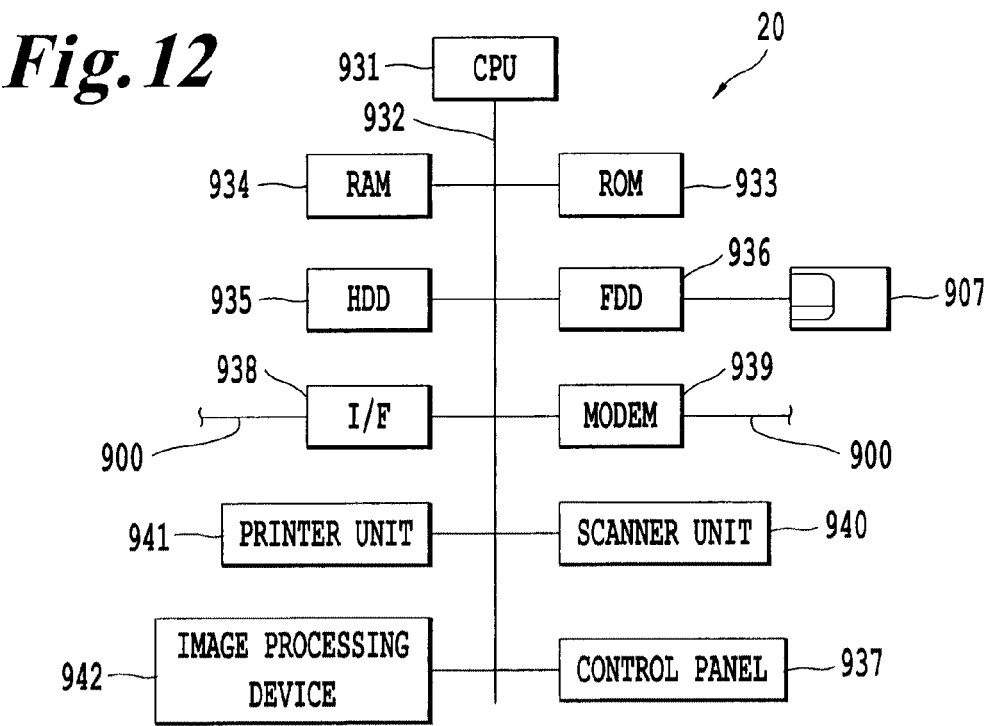
FIG. 12 is a block diagram illustrating an image processing device according to one embodiment of the present invention.
Figure 13:
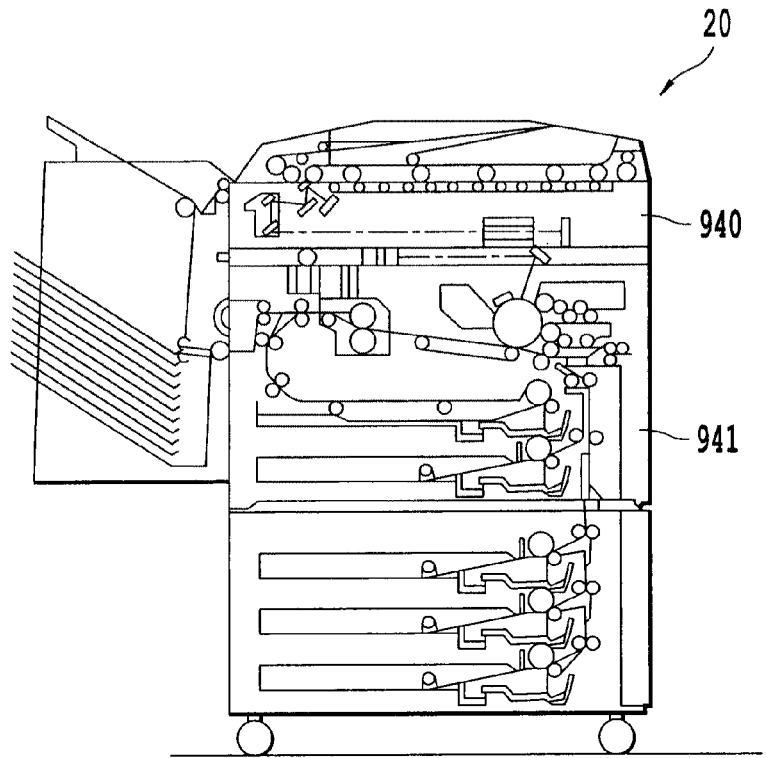
FIG. 13 is a schematic representation of an image processing device according to one embodiment of the present invention.

FIGS. 12-13 illustrate an example of the MFD 20, which includes a central processing unit (CPU) 931, and various elements connected to the CPU 931 by an internal bus 932. The CPU 931 services multiple tasks while monitoring the state of the MFD 20. The elements connected to the CPU 931 include a read only memory (ROM) 933, a random access memory (RAM) 934, a hard disk drive (HDD) 935, a floppy disk drive (FDD) 936 capable of receiving a floppy disk 907, a communication interface (I/F) 938, and a modem unit 939.

In addition, a control panel 937, a scanner unit 940, a printer unit 941, and an image processing device 942 can be connected to the CPU 931 by the bus 932. Both the I/F 938 and the modem unit 939 are connected to a communication network 100.

In a preferred embodiment, the program code instructions for the MFD 20 are stored on the HDD 935 via an IC card. Alternatively, the program code instructions can be stored on the floppy 907 so that the program code instructions may be read by the FDD 936, transferred to the RAM 934 and executed by the CPU 931 to carry out the instructions. These instructions can be the instructions to perform the MFD's functions described above. These instructions permit the MFD 20 to interact with the document manager server 40 via browser 25 and to control the control panel 937 and the image processing units of the MFD 20.

During a start-up of the MFD 20, the program code instructions may be read by the CPU 931, transferred to the RAM and executed by the CPU 931. Alternatively, the program code instructions may be loaded to the ROM 933. It is therefore understood that in the present invention any of the floppy disk 907, the HHD 935, the RAM 934, and the ROM 933 correspond to a computer readable storage medium capable of storing program code instructions. Other devices and medium that can store the instructions according to the present invention include for example magnetic disks, optical disks including DVDs, magneto-optical disks such as MOS, and semiconductor memory cards such as PC cards, compact flash cards, smart media, memory sticks, etc.

In a preferred embodiment, the control panel 937 includes a user interface that displays information allowing the user of the MFD 20 to interact with the document manager server 40, such as the user interfaces 300-303 illustrated in FIGS. 3A-3D. The display screen can be a LCD, a plasma display device, or a cathode ray tube CRT display. The display screen does not have to be integral with, or embedded in, the control panel 937, but may simply be coupled to the control panel 937 by either a wire or a wireless connection. The control panel 937 may include keys for inputting information or requesting various operations. Alternatively, the control panel 937 and the display screen may be operated by a keyboard, a mouse, a remote control, touching the display screen, voice recognition, or eye-movement tracking, or a combination thereof.

Figure 14:
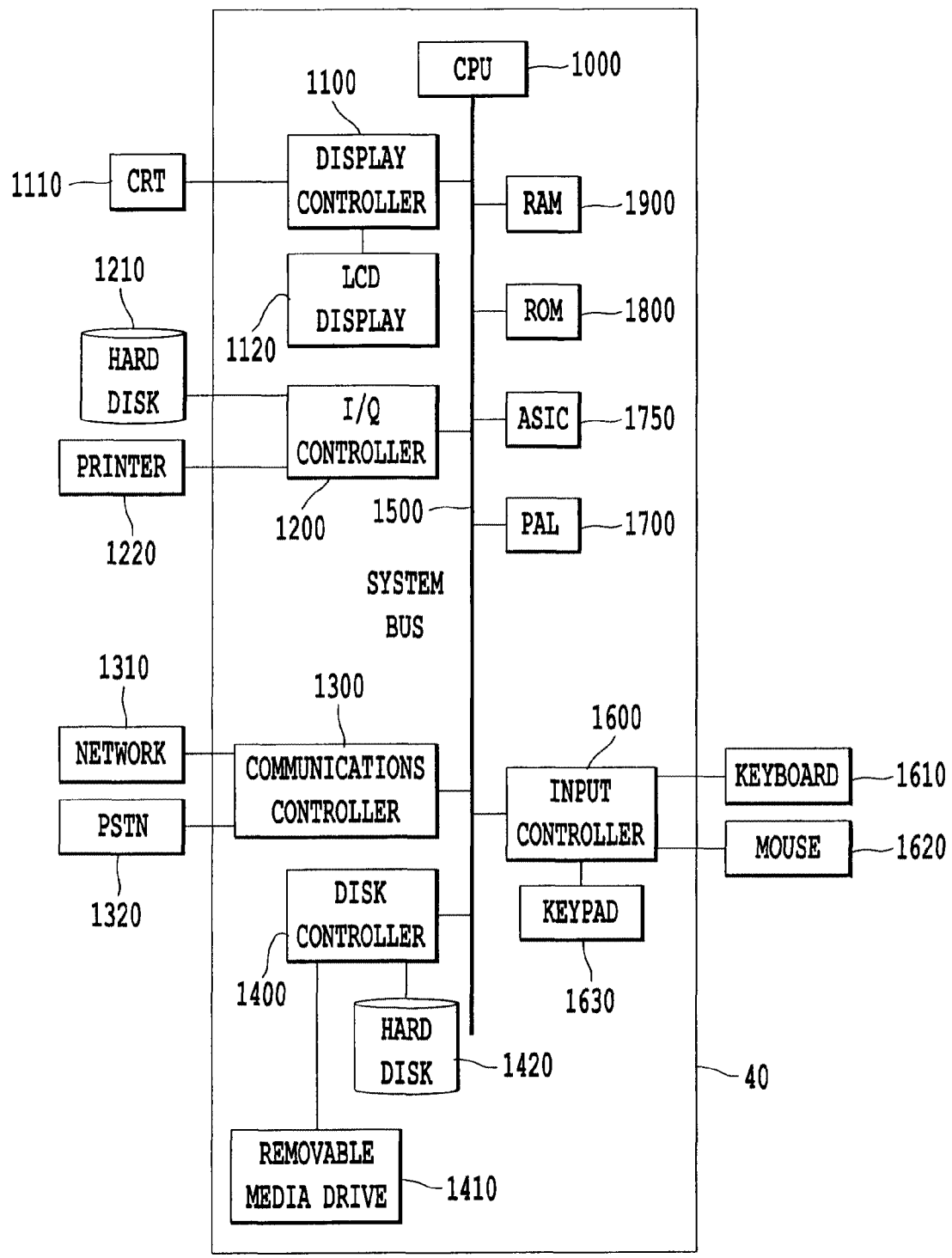
FIG. 14 is a block diagram illustrating a document manager server according to one embodiment of the present invention.
Figure 15:
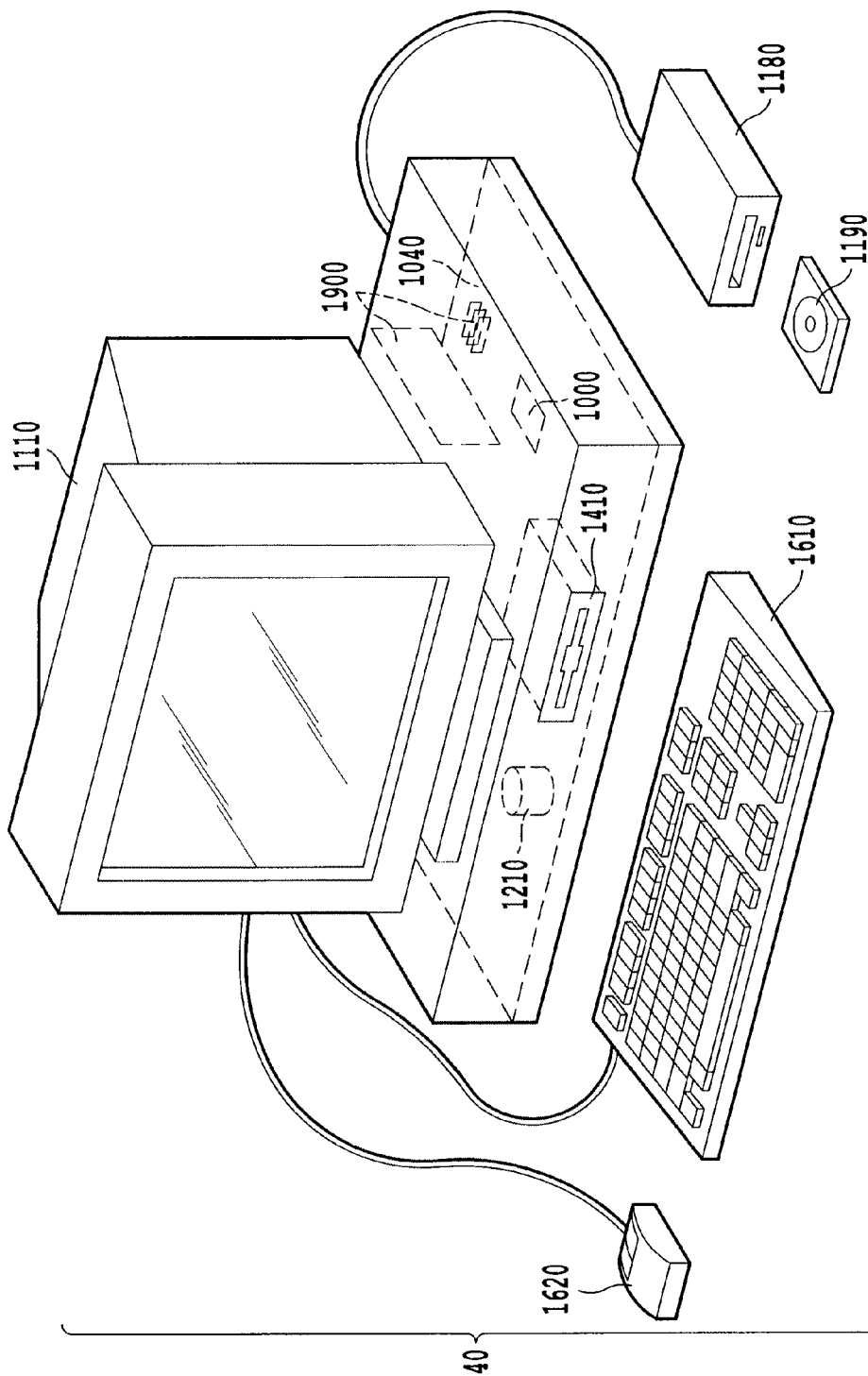
FIG. 15 is a schematic representation of a document manager server according to one embodiment of the present invention.

FIG. 14 is a block diagram of the server 40 according to one embodiment of the present invention. FIG. 15 is a schematic representation of the server 40. The server 40 includes a central processing unit 1000 (CPU) that communicates with a number of other devices by way of a system bus 1500. The server 40 includes a random access memory (RAM) 1900 that hosts temporary storage values used in implementing the authenticating, routing and managing functions of documents.

A conventional personal computer or computer workstation with sufficient memory and processing capability may also be configured to operate as the server 40. The central processing unit 1000 is configured for high volume data transmission and performing a significant number of mathematical calculations in processing communications and database searches. A Pentium 4 microprocessor such as the 3.4 GHz Pentium 4 manufactured by Intel Inc. or Advanced Micro Devices (AMD) Athlon 64 3.5 GHz processor may be used for the CPU 1000. Other suitable processors and multiple processors or workstations may be used as well.

The ROM 1800 is preferably included in a semiconductor form although other read-only memory forms including optical media may be used to host application software and temporary results. The ROM 1800 connects to the system bus 1500 for use by the CPU 1000. The ROM 1800 includes computer readable instructions that, when executed by the CPU 1000, can perform the different authenticating, routing and managing functions discussed above associated with scanned documents from MFDs. An input controller 1600 connects to the system bus 1500 and provides an interface with various peripheral equipment including a keyboard 1610 and a pointing device such as a mouse 1620. The input controller 1600 may include different ports such as a mouse port in the form of a PS2 port or, for example, a universal serial bus (USB) port. The keyboard port for the input controller 1600 is in the form of a mini-DIN port although other connectors may be used as well. The input controller 1600 provides sound card connections so that external jacks on the sound card allow users to attach microphone speakers or an external sound source. The input controller 1600 also may include serial ports or parallel ports as well.

A disk controller 1400 is in the form of an IDE controller and connects via ribbon cables to a floppy disk drive 1410 as well as a hard disk drive 1420, a CD-ROM drive 1180 and a compact disk 1190. In addition, a PCI expansion slot is provided on the disk controller 1400 or mother board that hosts the CPU 1000. An enhanced graphic port expansion slot is provided and provides 3-D graphics with fast access to the main memory. The hard disk 1210 may also include a CD-ROM that may be readable as well as writeable. A communication controller 1300 provides a connection, for example by way of an Ethernet connection to a network 1310, which can be the network 100. In one embodiment, the network 1310 and the connection to the communication controller 1300 are made by way of a plurality of connections including a cable-modem connection, DSL connection, dial-up modem connection, and the like that connect to the communication controller 1300.

An input/output controller 1200 also provides connections to external components such as an external hard disk 1210, printer 1220, which can be MFD 10-30, for example, by way of an RS 232 port, a SCSI bus, an Ethernet or other network connection which supports any desired network protocol such as, but not limited to TCP/IP, IPX, IPX/SPX, or Net-BEUI.

A display controller 1100 interconnects the system bus 1500 to a display device, such as a cathode ray tube (CRT) 1110. While a CRT is shown, a variety of other display devices may be used such as an LCD, or plasma display device.

The mechanisms and processes set forth in the present description may be implemented using a conventional general purpose microprocessor(s) programmed according to the teachings of the present specification, as will be appreciated to those skilled in the relevant arts. Appropriate software coding can readily be prepared by skilled programmers based on the teachings of the present disclosure, as will also be apparent to those skilled in the software art. In particular, the computer program product for authenticating, routing, and managing documents according to the present invention can be written in a number of computer languages including but not limited to C, C++, Fortran, and Basic, as would be recognized by those of ordinary skill in the art. The invention may also be implemented by the preparation of applications specific integrated circuits or by interconnecting an appropriate network of conventional component circuits, as will be readily apparent to those skilled in the art.

The present invention thus also includes a computer-based product that may be hosted on a storage medium and include instructions that can be used to program a computer to perform a process in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

Advantageously, the present invention can be incorporated with the system and method for managing documents disclosed in application Ser. No. 09/795,438, filed Mar. 1, 2001; U.S. application Ser. No. 10/243,645, filed Sep. 16, 2002; and U.S. application Ser. No. 10/294,607, filed Nov. 15, 2002; the entire content of each are hereby incorporated by reference.

Obviously, numerous additional modifications and variations of the present invention are possible in light of the above teachings. It is therefore to be understood that within the scope of the appended claims the present invention may be practiced otherwise than as specifically described herein.

The invention claimed is:

1. A method for managing documents, comprising:
    transmitting identification data from an image processing device to a server;
    retrieving, by the server, information corresponding to a plurality of network applications based on the identification data, the information including a file corresponding to at least one of the plurality of network applications;
    transmitting the information from the server to the image processing device only when a profile stored in the server corresponding to the identification data indicates that the image processing device is authorized to access the plurality of network applications;
    changing a functionality of the image processing device based on the received information by processing the file and changing the functionality of the image processing device based on the processing of the file;
    receiving job information at the server from the image processing device related to a document process by the image processing device;
    processing the job information at the server; and
    transmitting processed job information from the server to at least one of the plurality of network application connected to the server.

2. The method of claim 1, wherein retrieving the information comprises:
    retrieving profile information corresponding to the image processing device.

3. The method of claim 2, wherein the retrieving the information comprises:
    retrieving the profile information which includes an identification of each of the plurality of network applications.

4. The method of claim 1, wherein:
    receiving the information comprises receiving an executable file corresponding to at least one of the plurality of network applications; and
    changing the functionality of the image processing device comprises executing the executable file, and changing the functionality of the image processing device based on the execution of the executable file.

5. The method of claim 1, wherein changing the functionality of the image processing device comprises:
    changing a user interface of the image processing device based on the received information.

6. The method of claim 1, wherein the file corresponding to at least one of the plurality of network applications is an Extensible Markup Language (XML) file.

7. The method of claim 1, further comprising:
    adding processing instructions corresponding to the document process performed on the document by the image processing device.

8. A system for managing documents, comprising:
    a network interface at an image processing device configured to transmit identification data to a server;
    a module, at the server, configured to retrieve information corresponding to a plurality of network applications based on the identification data, the information including a file corresponding to at least one of the plurality of network applications;
    a network interface of the server configured to transmit the information from the server to the image processing device only when a profile stored in the server corresponding to the identification data indicates that the image processing device is authorized to access the plurality of network applications;
    a processor, at the image processing device, configured to change a functionality of the image processing device based on the received information by processing the file and changing the functionality of the image processing device based on the processing of the file;
    the network interface of the server configured to receive job information from the image processing device related to a document process by the image processing device;
    a processor, at the server, configured to process the job information; and
    the network interface, at the server, configured to transmit processed job information to at least one of the plurality of network application connected to the server.

9. The system of claim 8, wherein the module at the server is configured to retrieve profile information corresponding to the image processing device.

10. The system of claim 9, wherein the module at the server is configured to retrieve the profile information which includes an identification of each of the plurality of network applications.

11. The system of claim 8, wherein:
    the module at the server is configured to retrieve an executable file corresponding to at least one of the plurality of network applications, and
    the processor at the image processing device is configured to execute the executable file and change the functionality of the image processing device based on the execution of the executable file.

12. The system of claim 8, wherein the processor at the image processing device is configured to change a user interface of the image processing device based on the received information.

13. The system of claim 8, wherein the file corresponding to at least one of the plurality of network applications is an Extensible Markup Language (XML) file.

14. The system of claim 8, further comprising:
    a user interface at the image processing device configured to receive an instruction to add processing instructions corresponding to the document process performed on the document by the image processing device.

15. An image processing device, comprising:
    a network interface configured to transmit identification data to a server, and receive, from the server, information corresponding to a plurality of network applications connected to the server based on the identification data only when a profile stored in the server corresponding to the identification data indicates that the image processing device is authorized to access the plurality of network applications, the information including a file corresponding to at least one of the plurality of network applications;

a processor configured to change a functionality of the image processing device based on the received information by processing the file and changing the functionality of the image processing device based on the processing of the file; and the network interface configured to transmit job information to the server related to a document process by the image processing device.

16. The image processing device of claim 15, wherein the processor is configured to change a user interface of the image processing device based on the received information.

17. The image processing device of claim 15, wherein the file corresponding to at least one of the plurality of network applications is an Extensible Markup Language (XML) file.

18. The image processing device of claim 15, further comprising:

a user interface configured to receive an instruction to add processing instructions corresponding to the document process performed on the document.

* * * * *